(12) United States Patent
Choi et al.

(10) Patent No.: US 11,715,247 B1
(45) Date of Patent: Aug. 1, 2023

(54) GENERATING A FACIAL RIG FOR USE IN ANIMATING A COMPUTER-GENERATED CHARACTER BASED ON FACIAL SCANS AND MUSCLE MODELS OF MULTIPLE LIVE ACTORS

(71) Applicant: Unity Technologies SF, San Francisco, CA (US)

(72) Inventors: Byung Kuk Choi, Wellington (NZ); Gergely Klár, Wellington (NZ)

(73) Assignee: UNITY TECHNOLOGIES SF, San Francisco, CA (US)

(*) Notice: Subject to any disclaimer, the term of this patent is extended or adjusted under 35 U.S.C. 154(b) by 176 days.

(21) Appl. No.: 17/381,114

(22) Filed: Jul. 20, 2021

Related U.S. Application Data

(63) Continuation of application No. 17/117,909, filed on Dec. 10, 2020, now abandoned.

(60) Provisional application No. 63/047,826, filed on Jul. 2, 2020.

(51) Int. Cl.
*G06T 13/40* (2011.01)
*G06T 17/20* (2006.01)
*G06V 40/16* (2022.01)
*G06N 3/045* (2023.01)

(52) U.S. Cl.
CPC ............. *G06T 13/40* (2013.01); *G06N 3/045* (2023.01); *G06T 17/20* (2013.01); *G06V 40/176* (2022.01)

(58) Field of Classification Search
None
See application file for complete search history.

(56) References Cited

U.S. PATENT DOCUMENTS

| | | | |
|---|---|---|---|
| 9,314,692 B2* | 4/2016 | Konoplev | A63F 13/30 |
| 2004/0179013 A1* | 9/2004 | Menache | G06T 13/40 |
| | | | 345/473 |
| 2011/0141105 A1* | 6/2011 | Ting | G06T 13/40 |
| | | | 345/419 |
| 2016/0180568 A1* | 6/2016 | Bullivant | G06T 13/40 |
| | | | 345/473 |
| 2019/0325633 A1* | 10/2019 | Miller, IV | G06V 40/174 |
| 2021/0012549 A1* | 1/2021 | Comer | G06F 18/22 |
| 2022/0005249 A1* | 1/2022 | Choi | G06T 17/00 |

* cited by examiner

*Primary Examiner* — Sultana M Zalalee
(74) *Attorney, Agent, or Firm* — Haynes and Boone LLP

(57) ABSTRACT

An animation system wherein scanned facial expressions are processed to form muscle models based on live actors combines muscle models over a plurality of live actors to form a facial rig usable for generating expressions based on specification of a strain vector and a control vector of a muscle model for varying characters corresponding to live actors.

19 Claims, 26 Drawing Sheets

Muscle Model

| Muscle # | Bone Attachment Point for Muscle | Skin Attachment Point for Muscle | Muscle Volume (in cubic mm) |
|---|---|---|---|
| $M_1$ | $(x_1, y_1, z_1)$ | $(u_1, v_1)$ | $V_1$ |
| $M_2$ | $(x_2, y_2, z_2)$ | $(u_2, v_2)$ | $V_2$ |
| $M_3$ | $(x_3, y_3, z_3)$ | $(u_3, v_3)$ | $V_3$ |
| ... | ... | ... | ... |
| ... | ... | ... | ... |
| $M_N$ | $(x_N, y_N, z_N)$ | $(u_N, v_N)$ | $V_N$ |

| Joints | Description | Type of Value |
|---|---|---|
| J | Jaw | Angle |
| E.l | Left Eye | Rotation in 2D |
| E.r | Right Eye | Rotation in 2D |
| ... | ... | ... |

FIG. 3

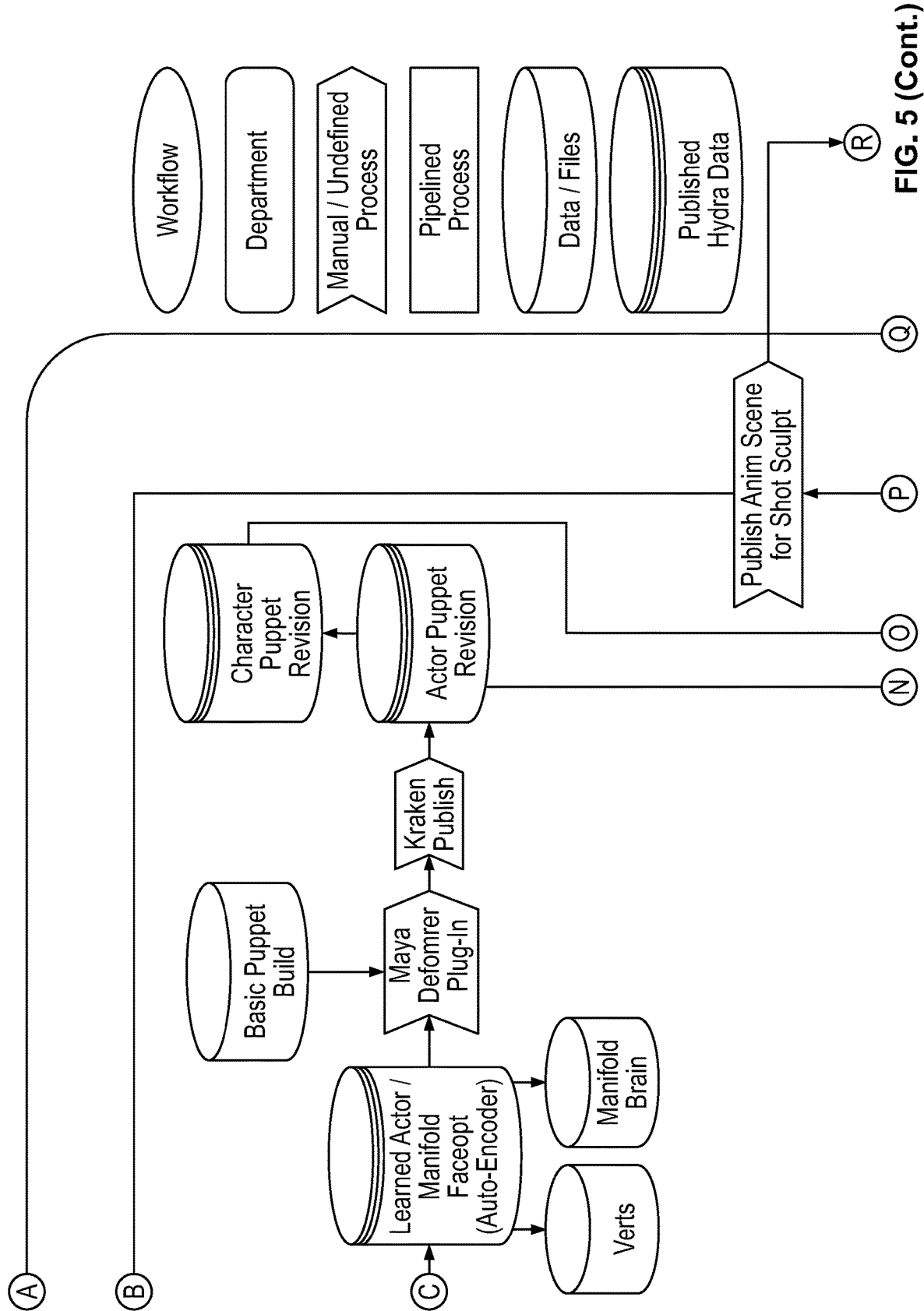

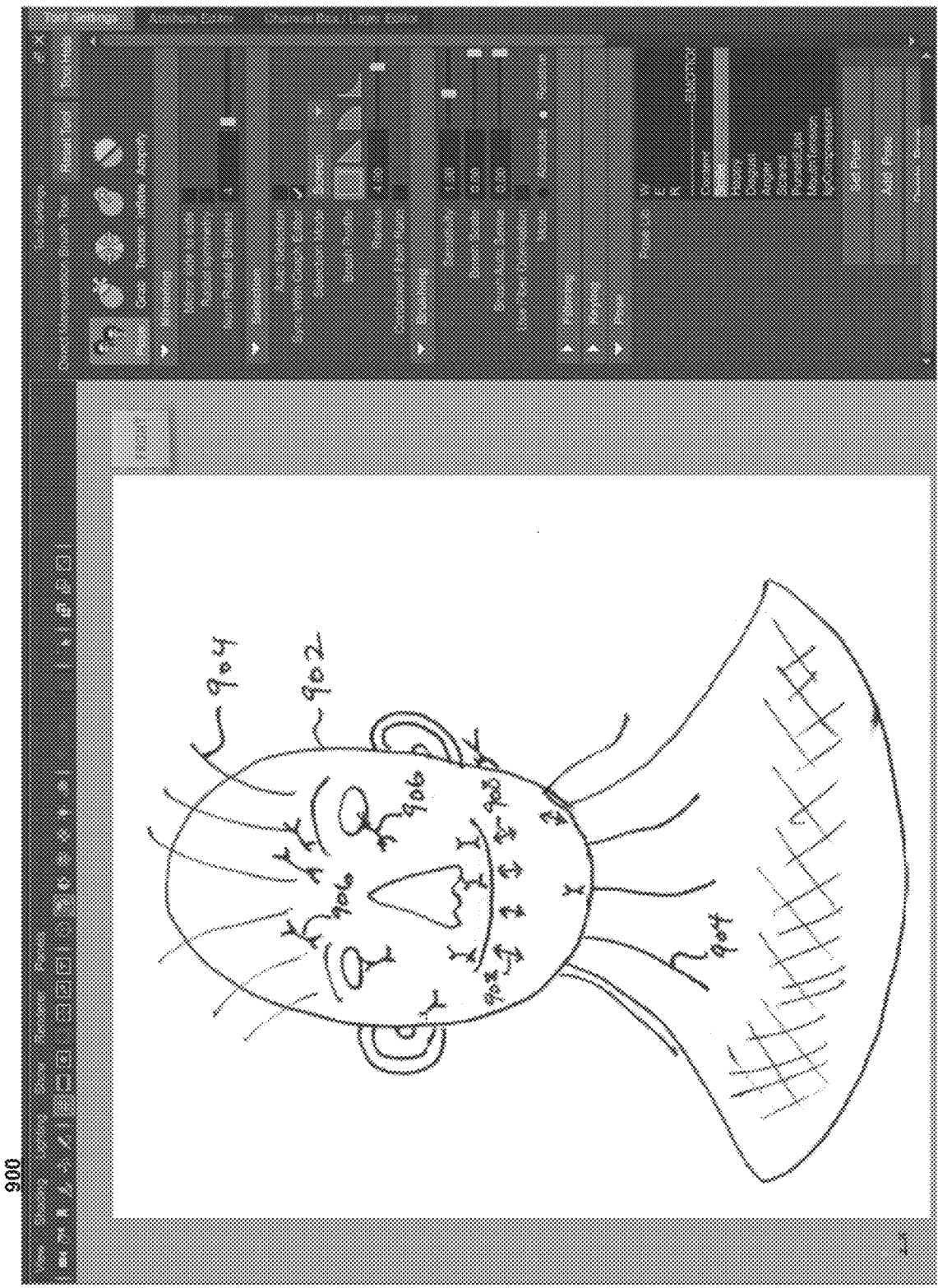

US 11,715,247 B1

GENERATING A FACIAL RIG FOR USE IN ANIMATING A COMPUTER-GENERATED CHARACTER BASED ON FACIAL SCANS AND MUSCLE MODELS OF MULTIPLE LIVE ACTORS

CROSS-REFERENCES TO PRIORITY AND RELATED APPLICATIONS

This application is a continuation of and claims priority to U.S. Nonprovisional application Ser. No. 17/117,909, filed Dec. 10, 2020, which in turn claims the benefit of U.S. Provisional Patent Application No. 63/047,826, filed Jul. 2, 2020 entitled "Generating a Facial Rig for Use in Animating a Computer-Generated Character Based on Facial Scans and Muscle Models of Multiple Live Actors".

The entire disclosures of the aforementioned applications recited above are hereby incorporated by reference, as if set forth in full in this document, for all purposes.

FIELD OF THE INVENTION

The present disclosure generally relates to tools for generating computer-generated imagery. The disclosure relates more particularly to apparatus and techniques for generating animation rigs used by animators in creating computer-generated imagery.

BACKGROUND

Many industries generate or use computer-generated imagery, such as images or video sequences. The computer-generated imagery might include computer-animated characters that are based on live actors. For example, a feature film creator might want to generate a computer-animated character having facial expressions, movements, behaviors, etc. of a live actor, human or otherwise. It might be possible to have an animator specify, in detail, a surface of the live actor's body, but that can be difficult when dealing with facial expressions and movements of the live actor, as there are many variables, and may differ from actor to actor.

SUMMARY

A computer-implemented method provides for generating a facial puppet usable in an animation system by receiving data associated with a first plurality of facial scans of a face of a first live actor over a first plurality of facial expression poses, training a first artificial intelligence system to match the first plurality of facial scans to a first muscle model that could, at least approximately, express some of the first plurality of facial expression poses; extracting from the first plurality of facial expression poses, physical deformations of a first facial surface of the face of the first live actor, receiving data associated with a second plurality of facial scans of a face of a second live actor over a second plurality of facial expression poses, and training the first artificial intelligence system to match the second plurality of facial scans to a second muscle model that could, at least approximately, express some of the second plurality of facial expression poses. Similar steps can be performed for additional live actors. A neural network can then be used to derive the facial puppet from muscle models of the plurality of live actors (wherein "live" indicates alive at the time of scanning, so could include now-deceased actors, and also might include human actors and/or nonhuman actors). An animation creation system can generate a mesh representing the facial puppet that is formable into expressions based on the facial puppet, strain vector values, and their corresponding deformations. The animation creation system can determine values for a set of vector values in a strain vector that adjust the mesh to form an animated facial expression that corresponds to a plausible facial expression from a live actor selected from the first live actor and the second live actor.

The method might include determining, for each of a set of live actors, a set of delta data for an actor corresponding to the facial puppet and the muscle model of the actor. The sets of delta data might be used to adjust an animation output that used the facial puppet. Determining values for the set of vector values might comprise strain values associated with expansion and contraction of a set of simulated facial muscles. The method might comprise constraining the strain vector values by a facial constraint manifold of a selected live actor and constraining might comprise projecting a nonplausible strain vector onto the facial constraint manifold to arrive at a plausible strain vector.

A computer-implemented method might generate an animated image comprising the methods above and render an animated image using the adjusted mesh forming the animated facial expression that corresponds to a plausible facial expression from live actors.

A computer system comprising one or more processors might include a storage medium storing instructions, which when executed by the at least one processor, cause the system to implement methods described. A non-transitory computer-readable storage medium storing instructions, which when executed by at least one processor of a computer system, might cause the computer system to carry out the methods described. A computer-readable medium carrying instructions, which when executed by at least one processor of a computer system, might cause the computer system to carry out the methods described.

BRIEF DESCRIPTION OF THE DRAWINGS

Various embodiments in accordance with the present disclosure will be described with reference to the drawings, in which:

FIG. 3 illustrates an example of a data structure that might represent a muscle model, in an embodiment.

FIGS. 6A-6B illustrate a user interface that an animator might use to interact with a facial puppet plug-in.

FIG. 9 illustrates a facial optimization module brush tool, according to an embodiment.

DETAILED DESCRIPTION

Figure 1:
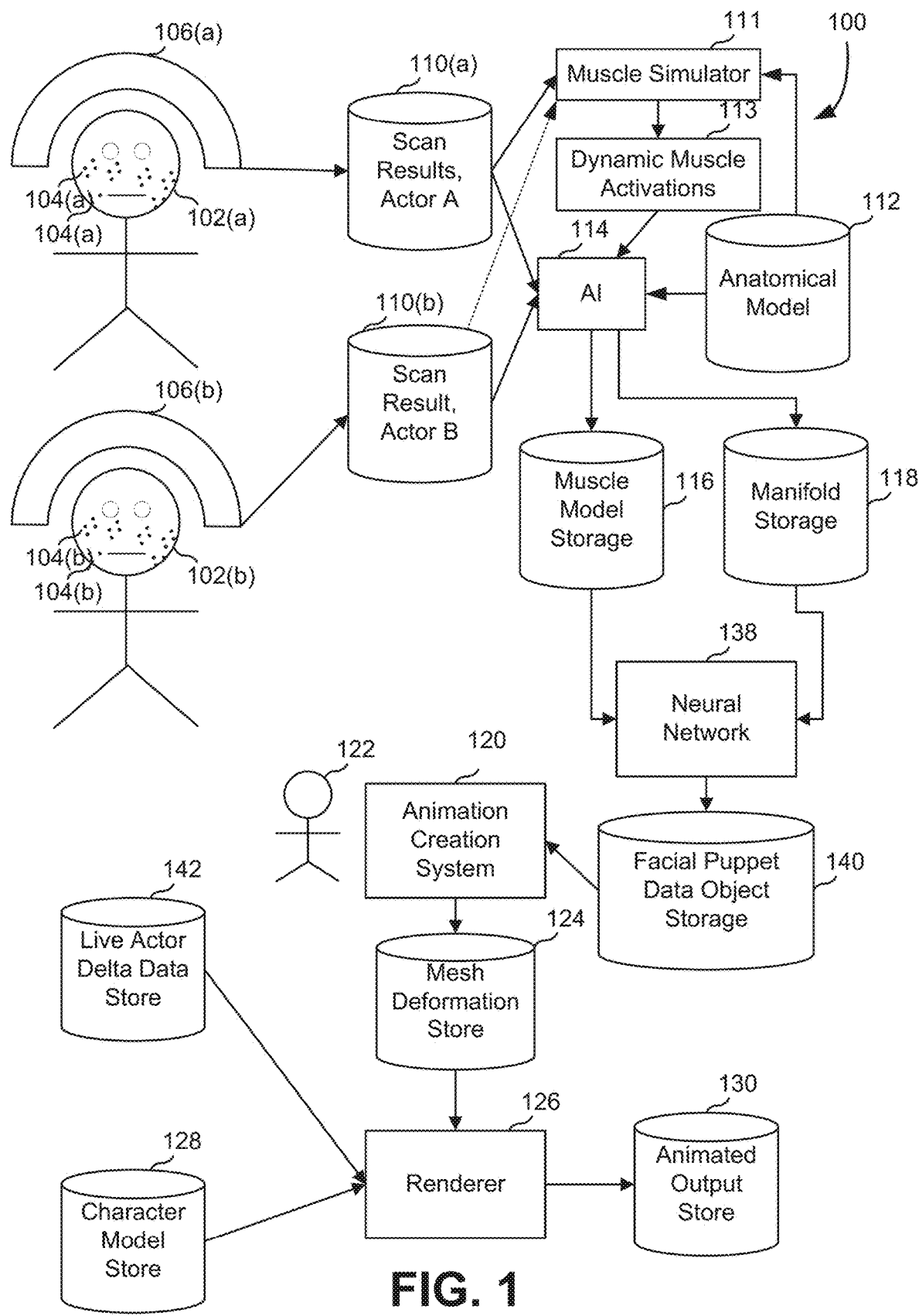
FIG. 1 illustrates an animation pipeline that might be used to render animated content showing animation of a character based on a model and a rig that is generated from scans of a live actor, in an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

An animator might be a human artist, filmmaker, photography image creator, or the like, who seeks to generate one or more images (such as a video sequence forming an animation) based on animator input and other data available to the animator In some embodiments, the animator might be an automated or partially automated process. Animator inputs might include specifications of values for positions of movable elements. For example, an articulated character's movement might be specified by values of each available joint in the character. A rig might be a representation of data that corresponds to elements of a character, the allowed movements, etc.

One such rig is a facial rig. An animator might be provided with a user interface of an animation creation system that allows the animator to input values for various movable elements of the facial rig. Some movable elements might be a jaw and a collection of muscles. From a specification of provided variables of the movable elements of the facial rig, the animation creation system can generate a pose of the facial rig. For example, when variables corresponding to an amount of contraction for the muscles on either side of the mouth are set to values that represent maximum contraction of those muscles, the animation creation system would output a pose with a face having a widened mouth. By varying the variables from frame to frame, and thus changing poses from frame to frame, animation creation system can output positions of elements, thicknesses of elements, etc., which might be provided as input to a rendering system.

Thus, an animator can generate animation of a face of a character making an expression, perhaps talking according to certain speech, and moving around by inputting, or otherwise specifying or determining, a set of strains, wherein a strain is a metric of a muscle that can be moved. In an example, a strain of a muscle is represented as a numerical value where 0.0 corresponds to the muscle in a rest or default position, a positive number corresponds to muscle contraction and a negative number corresponds to muscle relaxation. For example, the numerical value for a strain, S, of a muscle, M, might be as expressed in Equation 1.

$$S_M = (\text{rest\_length}_M - \text{length}_M)/\text{rest\_length}_M \quad \text{(Eqn. 1)}.$$

A difficulty with animating a face is that there are a large number of facial muscles and specifying a strain for each can be tedious, especially where many scenes need to be created. Another difficulty is in creating a model for the facial rig, specifying where each muscle attaches to a skull and to skin, or some other facial feature. For an animated face to look right, it is often necessary that the strains correspond to actual strains in live actor muscles, but it is not practical to determine, even for one live actor, where each muscle connects on that actor's skull and skin, the thicknesses of the muscles, subdermal structures, etc. and thus the building of a model and a facial rig that correspond to a particular live actor.

In an embodiment described herein, expressions of a live actor are determined for example, by scanning the actor's face to capture scanned data, which can identify how points on the surface of the actor's face move in three dimensions. A number of expressions can be scanned. While it is generally known which muscles are present in a face of a well-studies species, such as humans, there can be variability in where the muscles are attached, which are activated, where both ends are attached, their thicknesses, and what range of strains are possible. For example, a person with a "jowly" face would have different values for those than a person with a non-jowly face. As another example, there are some actors who are able to strain muscles (i.e., move them away from their rest positions) to cause their ears to wiggle and there are others who cannot strain those muscles.

An animation creation system and animators who use the animation creation system might want a model for a specific live actor, including their skull shape, muscle-to-skull attachment positions, muscle thicknesses, etc., to construct a facial rig that can be animated, but that might not be possible to determine directly from the live actor. One solution is to only rely on scanned expressions and the animator is permitted to create other expressions not directly scanned by specifying a linear combination of the available scans, but that is often constraining. The shape blending system might be treated as a rig that the animator can control by specifying blend shape weights, but for faces, this can be hard. Some results might be less than desirable as a human can create an almost infinite number of facial expressions and not all of those can be captured for blending.

FIG. 1 illustrates an animation pipeline 100 that might be used to render animated content showing animation of a character based on a model and a rig that is generated from scans of a live actor. As illustrated there, a live actor 102 ("Actor A") might be outfitted with fiducials 104 and have their face, expressions and/or body scanned by a scanner 106. The scanner 106 would then output or store results of scanning to a scan results store 110. The fiducials 104 allow for the scan data that results from scanning to include indications of how specific points on the surface of the face of the live actor 102 move given particular expressions.

Scans can be done across multiple live actors, generating separate data for each, as in Actor A (live actor 102(*a*)) having fiducials 104(*a*), a scanner 106(*a*) and scan results 110(*a*), while Actor B (live actor 102(*b*)) having fiducials 104(*b*), a scanner 106(*b*) provides for scan results 110(*b*). In some embodiments, a single scanner can be used to separately capture expressions and facial movements of many different live actors.

If the scanner 106 captures data in three dimensions ("3D"), the scan data could also indicate the surface manifold in 3D space that corresponds to the surface of the live actor's face. While it might be expected that the skull of the live actor 102 is a constant shape and changes only by translations and rotations (and jaw movement), it is not expected that the surface manifold would be constant, given jaw movements, air pressure in the mouth, muscle movements, and as other movable parts move and interact. Instead, different movements and facial expressions result in different thicknesses, wrinkles, etc. of the actor's face.

It might be assumed that each human actor has more or less the same facial muscles. An anatomical model dataset 112 might be provided that represents muscles, where they connect, what other typical facial elements are present (eyes, eyelids, nose, lips, philtrum, etc.) and other features likely common to most human faces. Of course, not all human faces are identical, and the actual positions of muscles, their thicknesses, where they connect to, how much they can relax and contract, are details that can vary from person to person, as well as the shape of their skull. It is typically not practical to directly determine these details from a specific live actor, as that might require invasive procedures or complex computerized axial tomography (CAT) or Magnetic resonance imaging (MRI) scans.

In some implementations, the scan results, e.g., of actor A and/or (optional) of actor B, may be provided to a muscle simulator 111 for analyzing the muscle movement from the scans, which may in turn generate dynamic muscle activation data 113 that is provided to the Artificial Intelligence system 114. In some implementations, scan results relating to another actor B 110(b) can also be sent to the muscle simulator 111 for generating dynamic muscle activations 113 based on scan results of actor B.

In one embodiment, the muscle simulator 111 may obtain an anatomical model from anatomical model dataset 112 as well, based on which the muscle simulator 111 may generate dynamic muscle activations for actor A or B. In some implementations, the muscle simulator 111 may obtain a generic anatomical model that is applicable to either actor A or actor B. In another implementation, the muscle simulator 111 may obtain a specific anatomical model customized for actor A or actor B, based on which dynamic muscle activation that is specific to actor A or B may be generated, together with the scan results 110a for actor A or the scan results 110b for actor B, respectively.

To determine the underlying specifics of a live actor, an Artificial Intelligence (AI) system 114 obtains the scan results from scan results store 110 and an anatomical model from anatomical model dataset 112, and infers—perhaps by iterative training—the shape of the live actor's skull, volume of muscles, range of motion, etc., to build a muscle model for the actor that is stored in muscle model storage 116, which might store different models for different actors. The AI system 114 might also output a manifold to be stored in manifold storage 118. Muscle model storage 116 might store muscle models over a plurality of live actors and manifold storage 118 might store manifolds over the plurality of live actors. The manifold might represent the range of plausible expressions, which can vary from actor to actor. Logically, the manifold might represent a set of solutions or constraints in a high-dimension space corresponding to a strain vector.

Using an animation creation system 120, an animator 122 could generate meshes that correspond to facial expressions of the live actor for whom the muscle model was derived. A mesh might be stored in a mesh deformation store 124. If mesh corresponded to the facial surface of the live actor, the animation creation system 120 could be used by the animator 122 to generate a facial surface of an expression that was not specifically made by the live actor, but would be near what it would be if the live actor had tried that expression. The animation creation system 120 might constrain an animator's inputs by projecting them onto the manifold, which would have an effect of transforming animator inputs that are not corresponding to a plausible expression into a strain vector that does correspond to a plausible expression. The animator's inputs might be represented in memory as a strain vector, having components corresponding to some facial muscles, as well as other animation variables that might not be related to muscles or that are more easily represented directly, such as jaw movement, eye movement, and the like.

A renderer 126 can process the facial surface, perhaps mapping it to a character model from a character model store 128, such as a non-human character played by the live actor, to form animated output that might be stored in animated output store 130.

To handle multiple live actors, the muscle models and manifolds of a plurality of live actors might be provided to a neural network 138 that can derive from them a facial puppet data object that corresponds to feasible and/or possible facial movements that might be applied to various characters based on various live actor performances. The facial puppet data object might be stored in facial puppet data object storage 140, which in turn can be supplied to animation creation system 120. The renderer 126 might also use live actor delta data from a live actor delta data store 142 to inform rendering.

Figure 2:
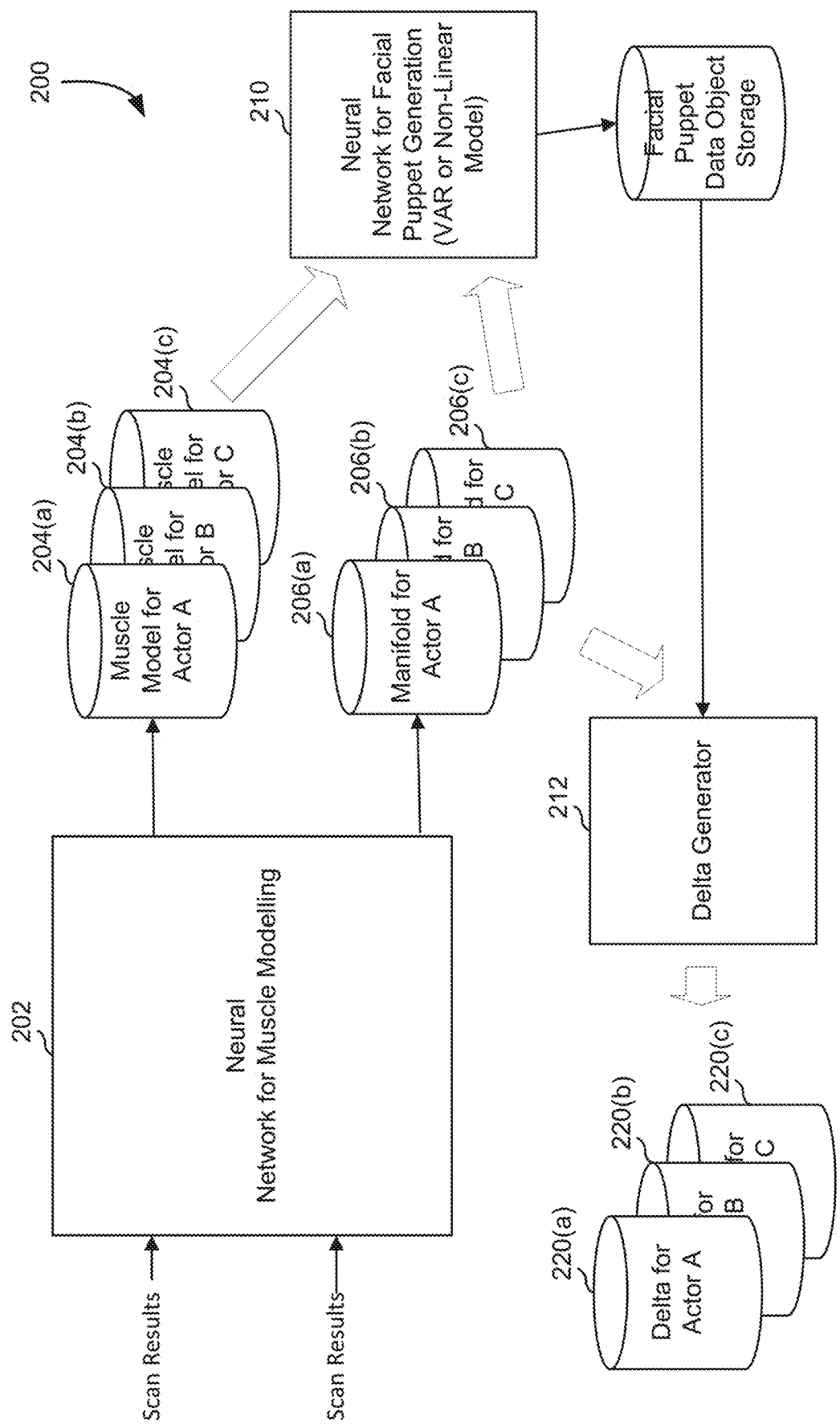
FIG. 2 illustrates an example neural network, in an embodiment.

FIG. 2 illustrates an example neural network 202 that might take in scan results and an anatomical model and output a muscle model to muscle model storage 204 and a manifold to manifold storage 206. The scan results from different live actors might be stored separately, as muscle models 204(a)-(c) and manifolds 206(a)-(c). A neural network 210 for facial puppet generation might use those to derive a facial puppet. A delta generator 212 might generate "deltas" for some or all of the live actors represented in the muscle models and manifolds. The deltas 220 would allow for an animation artist to work with the facial puppet independent of the particular live actor or the character played by the live actor and then the variances specific to that live actor can be merged in afterwards.

FIG. 3 illustrates an example of a data structure that might represent a muscle model. In that model, each muscle might be defined by a bone attachment point, a skin attachment point, and a muscle volume. In animation, as the strain on a muscle changes, the volume of the muscle might change shape, and the distance between the bone attachment point and the skin attachment point might change, thus creating expressions. Additional elements might be included in a control vector that are for other animation variables.

Figure 4:
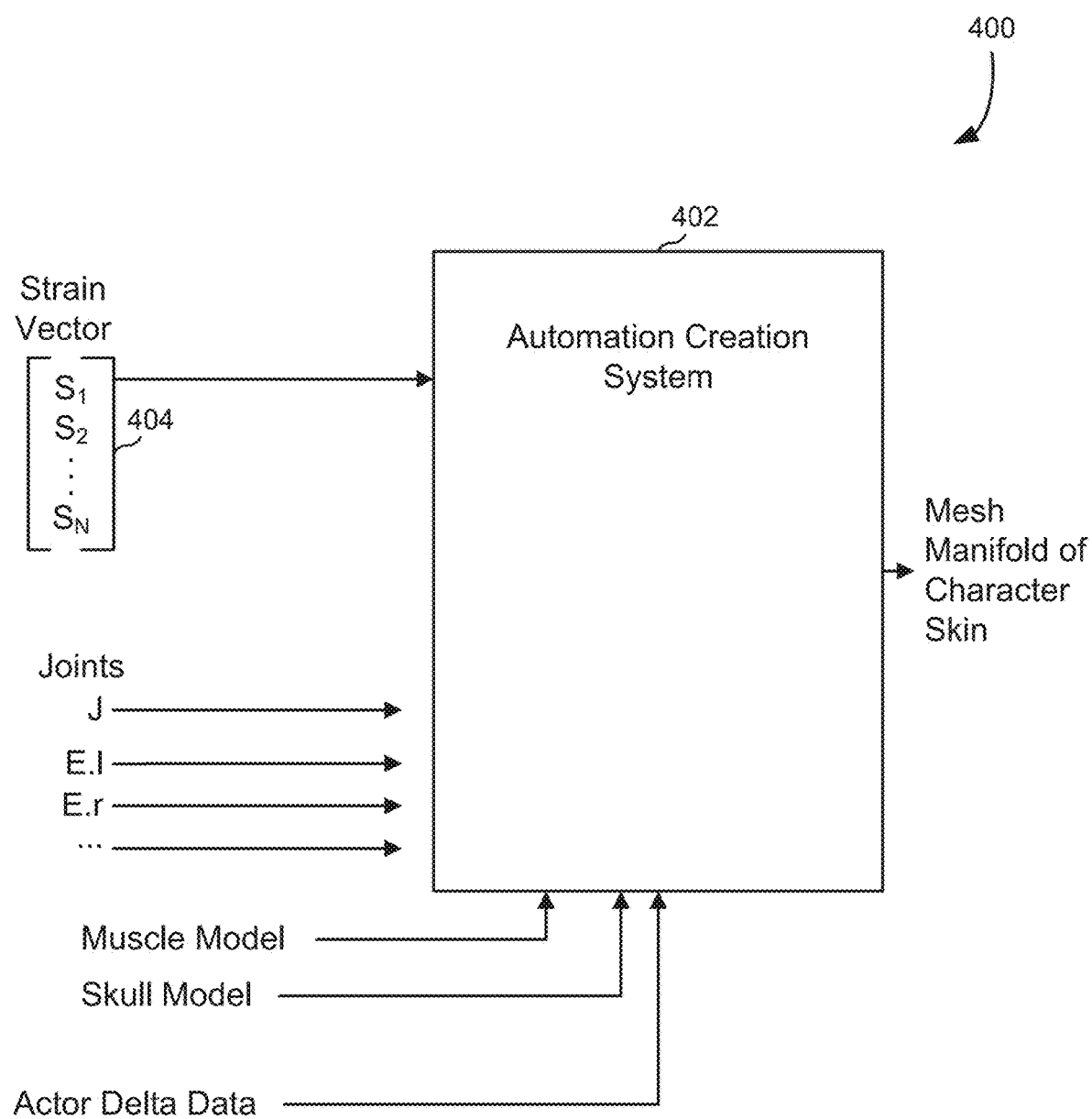
FIG. 4 illustrates inputs and outputs of an animation creation system, in an embodiment.

FIG. 4 illustrates inputs and outputs of an animation creation system 402. Inputs might include an input strain vector 404, indicative a strain values for some or all of the muscles in the muscle model, and values for the other animation variables, such as a scalar value for a jaw angle, two 2D vectors corresponding to rotations of the eyes, etc. Along with the muscle model, which describes where the muscles are attached and their volume, and a skull model representing an actor's skull shape and contour, and a control vector for other non-muscle animation variables, the animation creation system 402 can determine the volumes occupied by the muscles, and thus the surface of the character's skin, and output a mesh manifold of the character's skin, possibly depicting an expression corresponding to the input strain vector 404. Where facial puppets are used, the muscle model and skull model might instead be represented by the facial puppet and the automation creation system can use the delta data for the particular live actor.

Using the above methods and apparatus, an animator can specify a facial expression in the domain of muscle semantics, which can simplify an animation process compared to limiting the animator to making combinations of recorded expressions as blends of the scanned facial shapes. In the general case, a length of a muscle is determined from its strain value and its rest length. Allowed strain values might be constrained by the manifold so that strain values remain within plausible boundaries. For a given scan of an expression on a live actor's face, a muscle model for that live actor, and a skull model for that live actor, an AI process can determine a likely strain vector that, when input to an animation generation system, would result in an expression largely matching the scanned expression. Knowing the strain values, the animation generation system can provide those as the domain in which the animator would modify expressions. After training an AI system using dynamic scans of a live actor's face as the ground truth for training, the muscle model can be derived that would allow for the simulation of other expressions that were not captured.

In some instances, there might be more than one hundred muscles represented in the muscle model and the AI system that extracts a strain vector and a control vector from dynamic scans of a live actor might be able to provide approximate solutions to match expressions. The control vector might include other values besides jaw and eye positions.

As explained herein, an animation process might simulate facial expressions through the use of a unique combination of hi-resolution scans of a human face, simulated muscles, facial control vectors, and constraints to generate unlimited facial expressions. In one embodiment, an AI system is employed to receive facial control vectors generated from a series of muscle strain inputs and process those vectors relative to a facial expression manifold configured to constrain facial expressions of the simulation to plausible expressions.

Separate AI systems might be used to train and derive the muscle model and to train and derive the manifold. In some embodiments, in order to hit a target expression (and corresponding skin shape), the muscle model might be differentiable. An AI system might include a variational autoencoder (VAE).

The AI uses muscle control vectors, instead of blend shape weights or other approaches, and can then specify strains on those muscle control vectors, which would in turn specify lengths of contractions of the muscles in a simulator. Each muscle scan be represented by a curve, which might have a length that is a function of the strain. A muscle vector might comprise strains that affect a mesh representing the skin of a character. The muscles might include a rest length and attachment point, and together represent a muscle geometry. Using the combination of the input scans, the strains, the muscle control vectors, and manifold constraints, an animation system can output plausible facial expressions.

Once a facial puppet is generated, it can be provided to an animation system so that an animator can specify facial expressions and movements for computer-generated animation imagery.

The facial puppet is derived from scans of multiple live actors and the facial puppet models the anatomically informed properties of actors' faces and applies statistically-derived properties through to the character.

Global manifolds or actor-specific manifolds might be provided, wherein a manifold constrains what strain vectors can be applied to the facial puppet, allowing the animator to animate the facial puppet while guiding a facial animator to stay inside of a character look while minimizing the need for manual intervention to modify the actor/character manifold.

A brush tool might be included to automate the puppet build and allow facial animators to pose a face guided by a learned manifold. An Actor-to-character transfer tool might provide for transferring an actor's facial shape motion to a character. The tools might be part of an animation system that handles other tasks. The animation system might include the Maya tools provided by Autodesk, Inc. of San Rafael, Calif..

Figure 5:
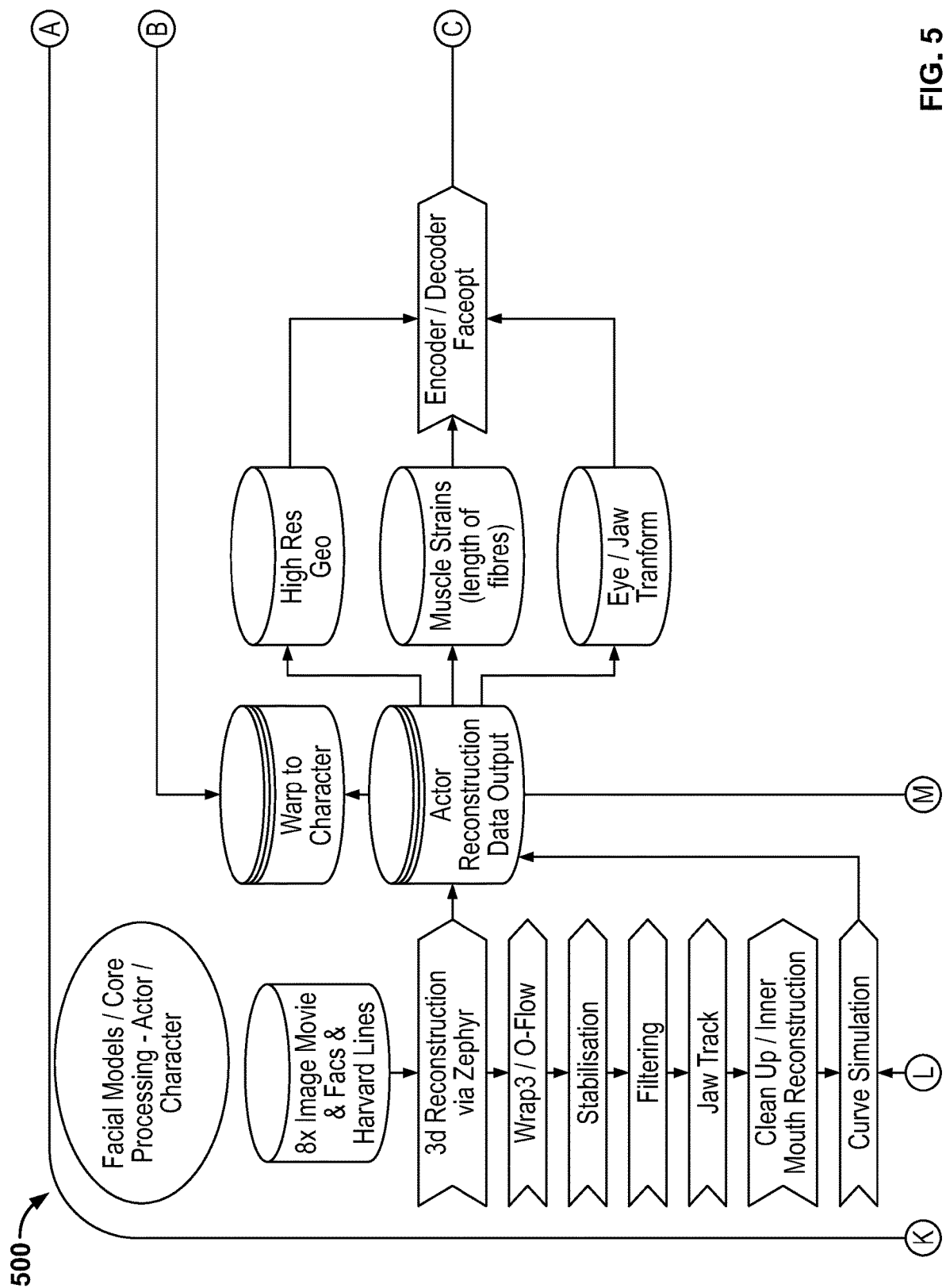
FIG. 5 shows illustrates an animation system that might be used to generate facial puppet data structures that might be used in embodiments.
Figure 5:
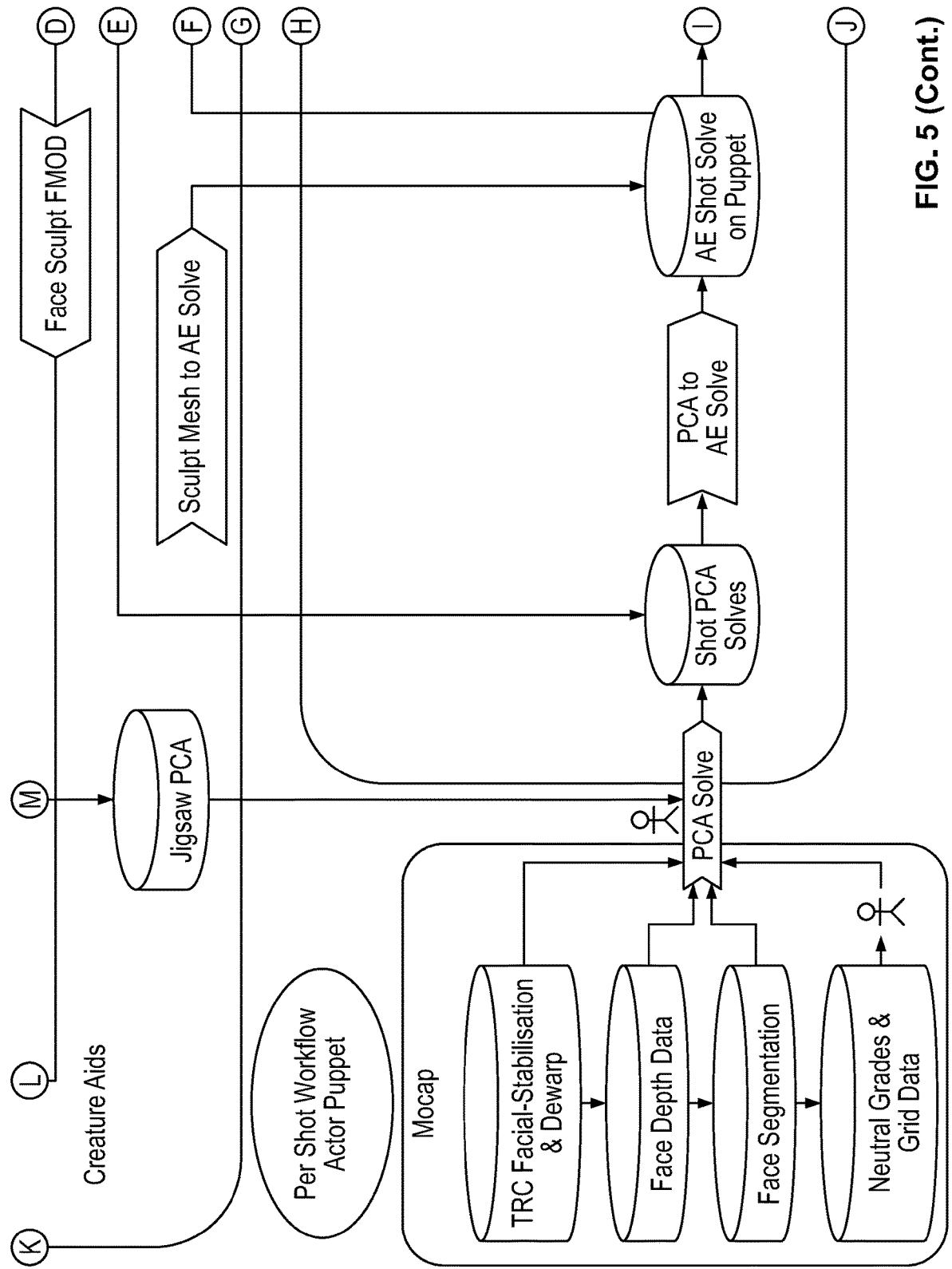
Figure 5:
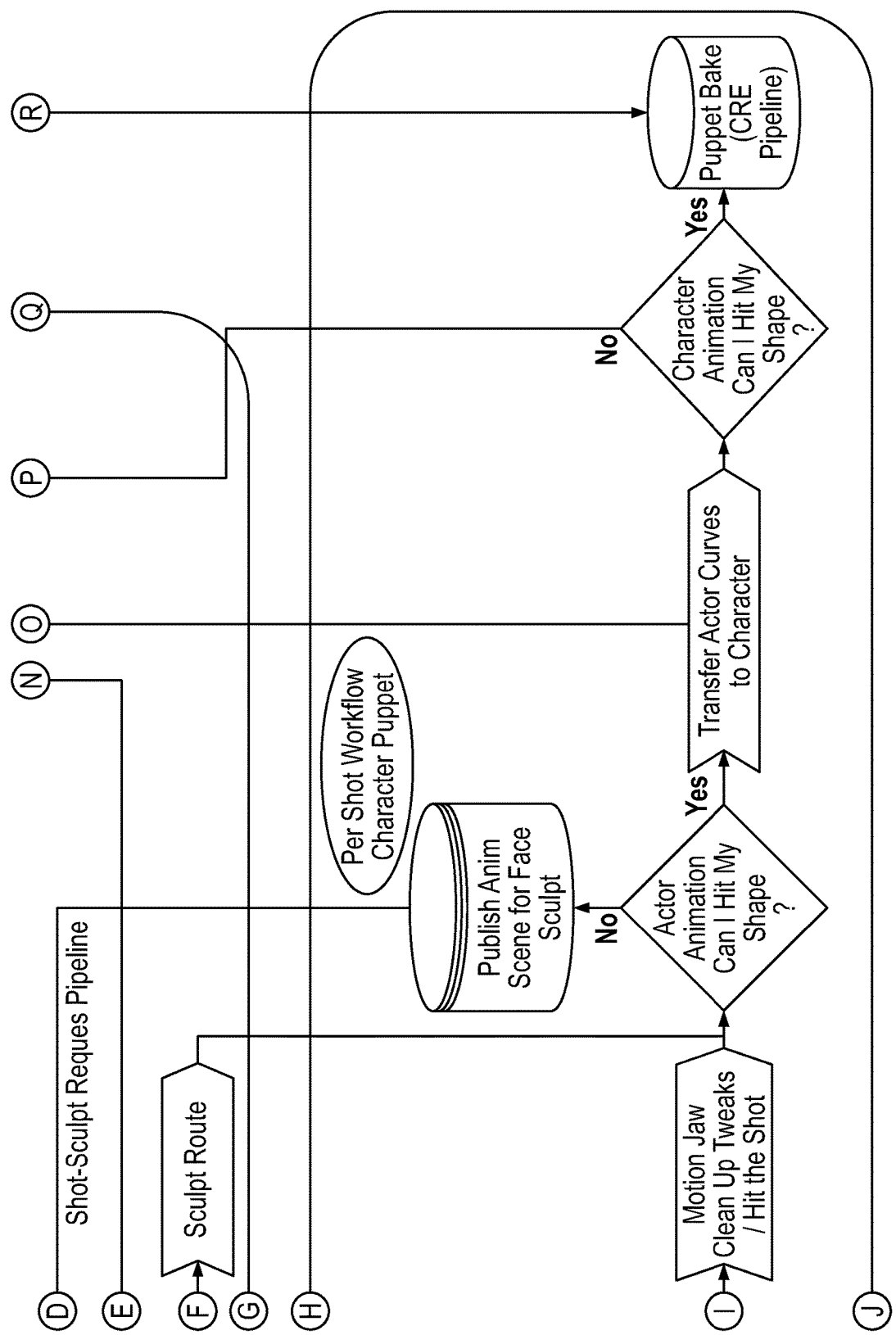

FIG. 5 shows illustrates an animation system that might be used to generate facial puppet data structures that might be used in the processes described herein. The top left shows the jigsaw bundle creation process, in which scans are obtained of live actor. The scans might be supplemented with photogrammetry, wrap, and stabilization steps to produce a clean animated skin bake, and other resources. The top / middle of FIG. 5 illustrates an optimization process and training steps. A jigsaw bundle might include high res geo and simulated strains as inputs to an encoder. The training result can be used as a manifold of the facial puppet. The scans might include elements extracted from the shots such as facial markers, depth estimates, and facial segmentation (e.g., lip contours). This can be used to produce an animated actor mesh with coherent topology, which can then be used as the target for an autoencoder solver that simulates strain curves. The results of this can either be transferred to the character, or become a shot-sculpt and published as a jigsaw bundle.

As explained herein, the facial data from multiple actors can be combined.

Animators can pose a face with a custom brush tool plugin that interfaces with a facial puppet plugin node and uses a learned manifold to help guide brush manipulation to stay within the actor or characters look.

Figure 6A:
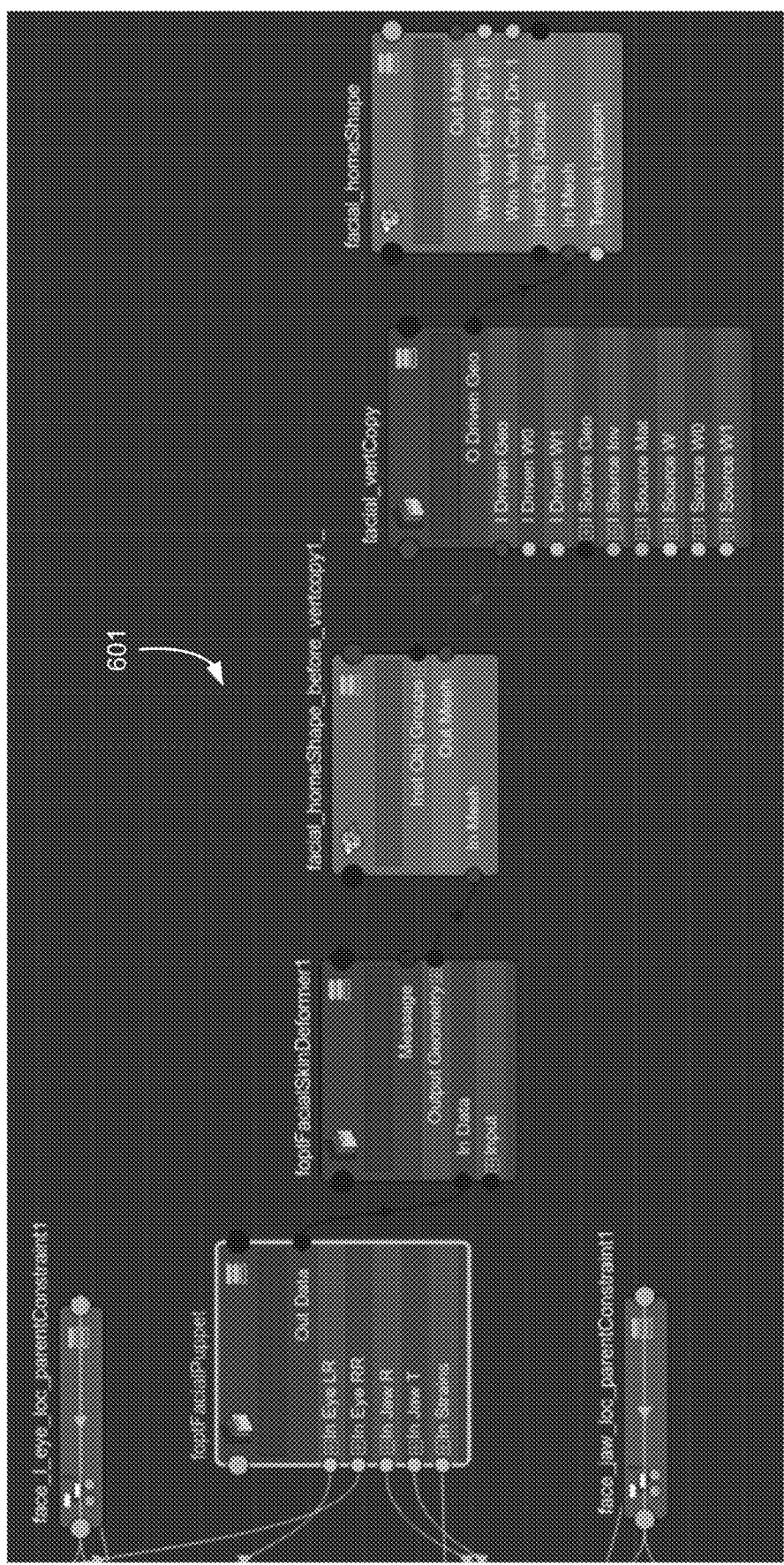
Figure 6B:

FIGS. 6A-6B illustrates a user interface 601 and 602 that an animator might use to interact with a facial puppet plug-in, which might access the learned manifold of an actor or character, muscle strain curves, and a database of parameters. The interface 601 and 602 may be integrated and displayed in parallel in one interface.

A facial rig might be a facial puppet that is prepped for baking and might contain extra deformers that are too slow to be added to the facial puppet directly. An animator can turn these on and off, if needed, to obtain fast feedback from the facial puppet.

Using these facial puppets, an animation pipeline can automatically learn an actor's manifold from the motions of the facial shapes and the underlying muscle strain curves, and these can be combined across actors to obtain a general facial puppet.

By guiding the animator to stay within the manifold, puppet builds can be done with less artist time, while at the same time providing higher fidelity and more plausible results seen in shots.

The system might include a facial optimization framework, a puppet engine, jaw and strain solvers, a Maya evaluation, deformer plugins, brush tools, and other helpers.

A deep neutral network module might be provided for facial data manufacturing, training, solving and some helpers. The resulting manifold data can be used to build an intermediate puppet. A brush tool can be used to interactively pose an actor or character facial puppet, while the manipulation is guided by the trained manifold. The brush tool might interface with a puppet node. Actor-to-character shape transfer might be provided by a standalone or core tool that performs actor to character shape transfer. A character jigsaw bundle can be generated using this tool.

A facial optimization module might contain a facial optimization framework, which constructs input data for training The facial optimization module might also include a puppet engine for run-time cache evaluation, jaw and strain solvers, Maya evaluation and deformer plugins, and other helpers.

A brush tool is also provided to allow animators to quickly pose the facial puppet, while the manipulation is guided by the trained manifold.

A facial optimization module might contain a facial puppet generation system that includes a puppet cache optimizer, a puppet engine for run-time cache evaluation, a database reconstructor based on states (joint transforms and strain values, etc.). The facial puppet solver might include a jaw solver, a strain solver, a PCA mesh strain solver, and a solver targeting a TRC markers or depth cues.

A deep neutral network module might have functionalities of facial data manufacturing, training, solving, and some helpers (for example heat map for evaluation).

The deep neural network might learn how to constrain implausible facial expressions onto the manifold of plausible expressions. Secondly, it can provide good computational efficiency for TRC solving. Also, it can find correlations of muscle strain features, giving an anatomical understanding from the dynamic scan training data.

An autoencoder architecture can be used to train the system to find jigsaw bundles. Depending on the process, it might take about one to three hours to learn a facial manifold with as many as 10,000 iterations. The autoencoder receives as input strain data that a processed facial optimization module cache provides as the training input and outputs a deep neural network product.

A puppet build process might comprise an optimization step and a deep learning step. In the optimization step, a database file is produced using the facial optimization module with optimized deformation matrices. Optimization can be a multi-stage process, producing optimized files for jaw only, eyes only, etc., as runtime files. In the deep leaning step, training might be from generated optimization data by facial optimization module.

One format for data is a facial optimization module binary file to manage related data for data-driven puppet creation. Another format is for handling static definitions such as rest-pose information of one actor or a character. This might include a mesh extracted from a static Maya file.

A dynamic format file type might be used for concatenation of jigsaw bundles (cage, skin, fibers, joint xforms, etc.).

A runtime file format might contain optimized deformation matrices for each part (jaw, eye, skin) that can be lightweight (~100 MB).

Figure 7:
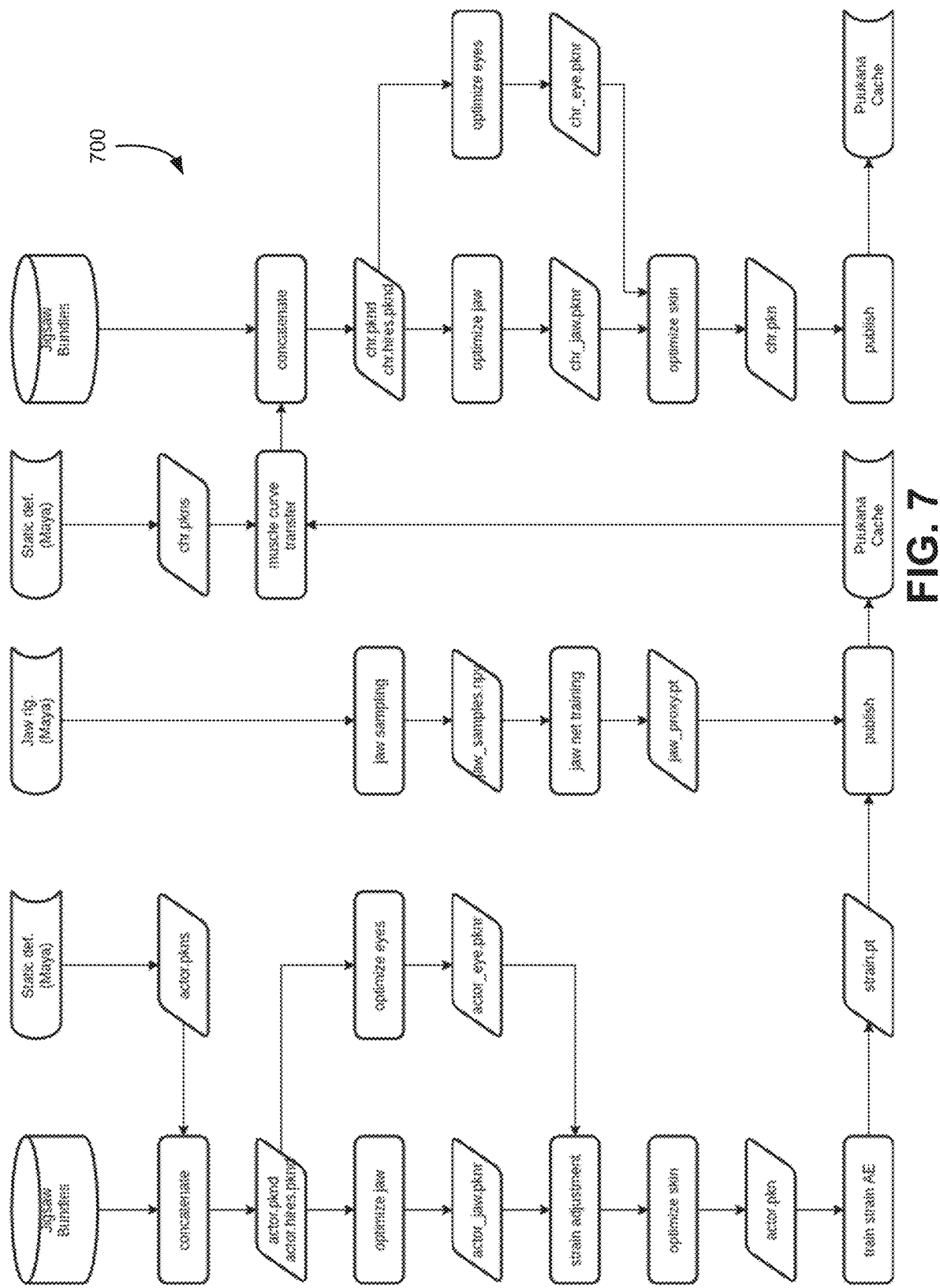
FIG. 7 illustrates how a jigsaw bundle master file is concatenated, among other steps.

FIG. 7 illustrates how a jigsaw bundle master file is concatenated and then optimization steps are performed for an actor, and how a training process and a cache is generated. The right side of FIG. 7 illustrates a character flow, with the actor and a cache becoming an input.

Figure 8A:
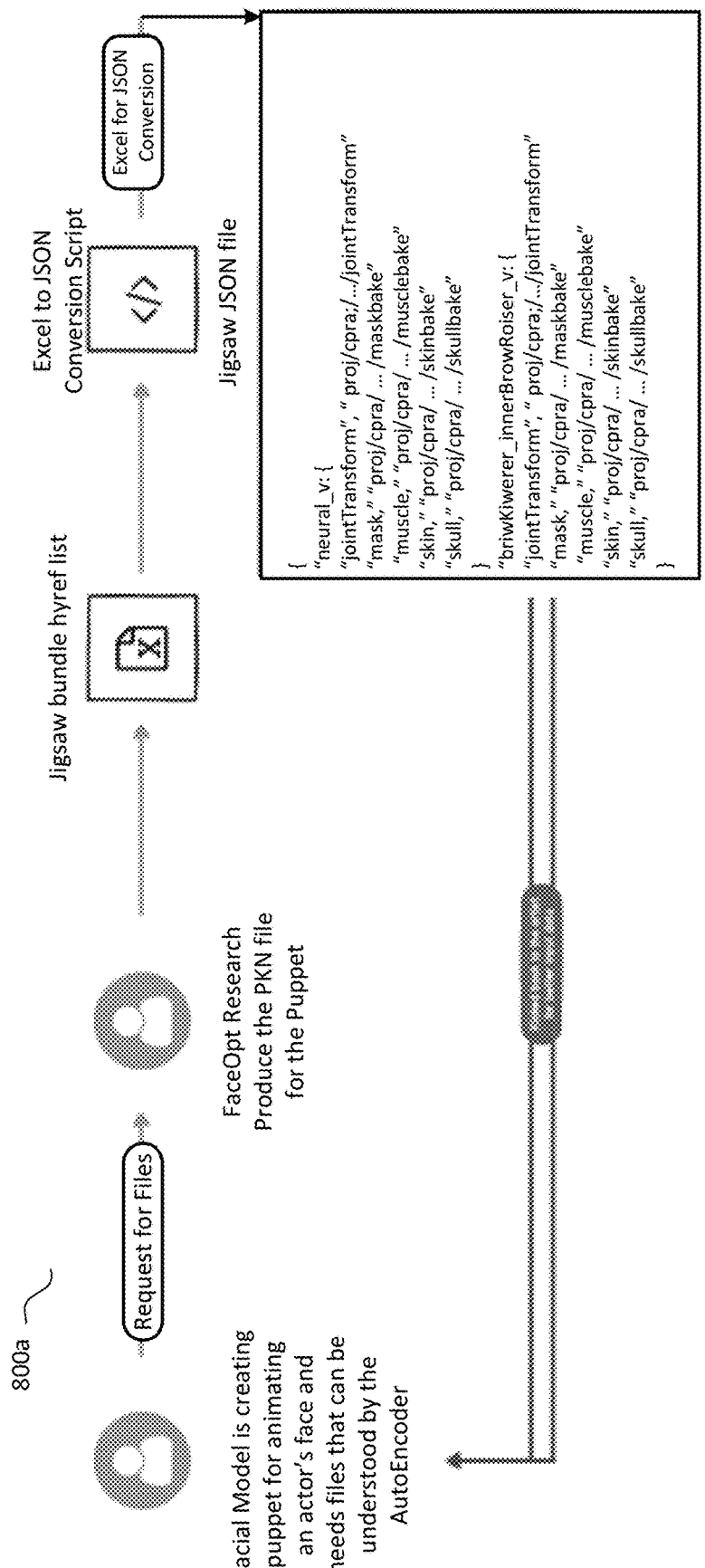
FIGS. 8A-8C illustrate a facial optimization module optimization and training.
Figure 8B:
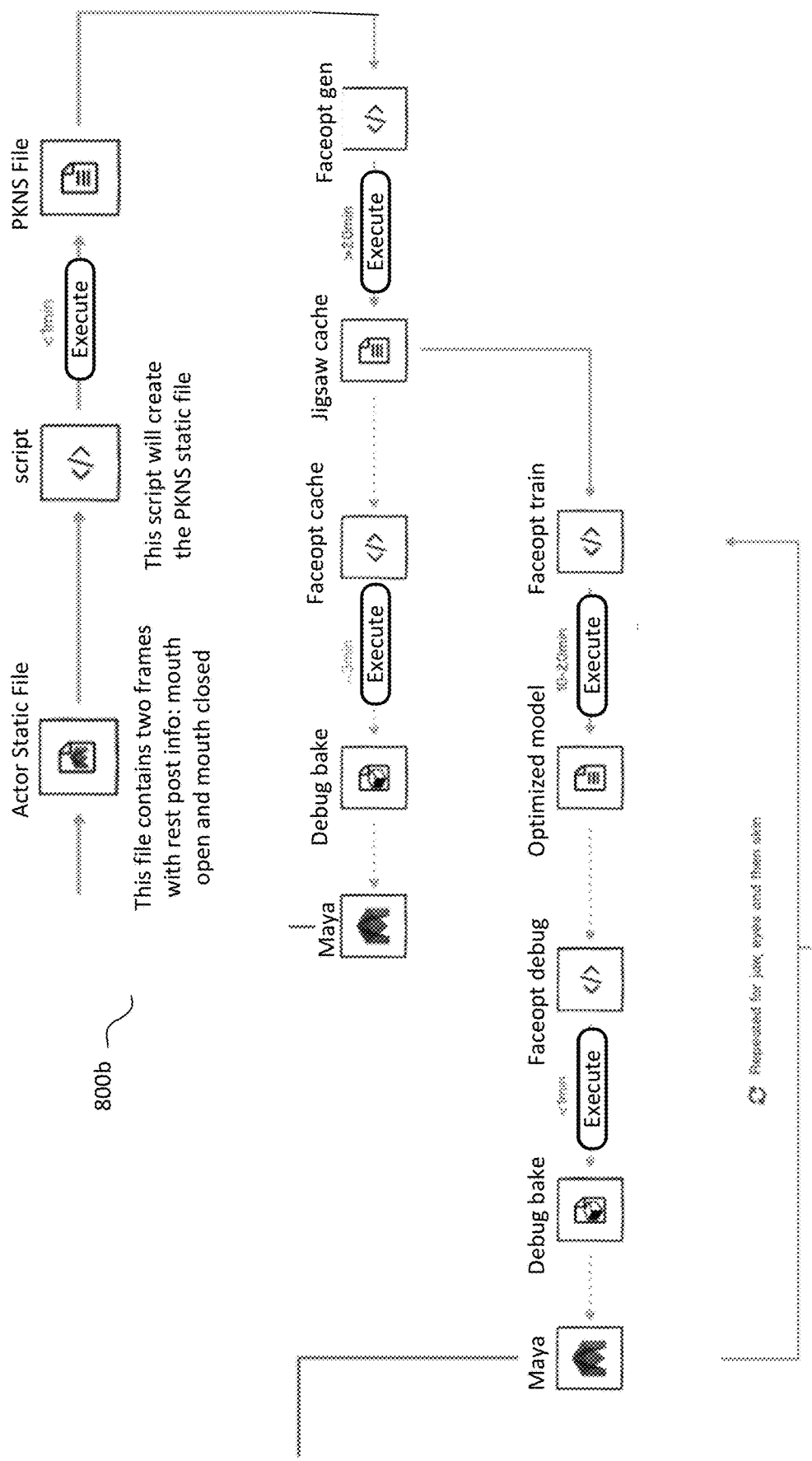
Figure 8C:
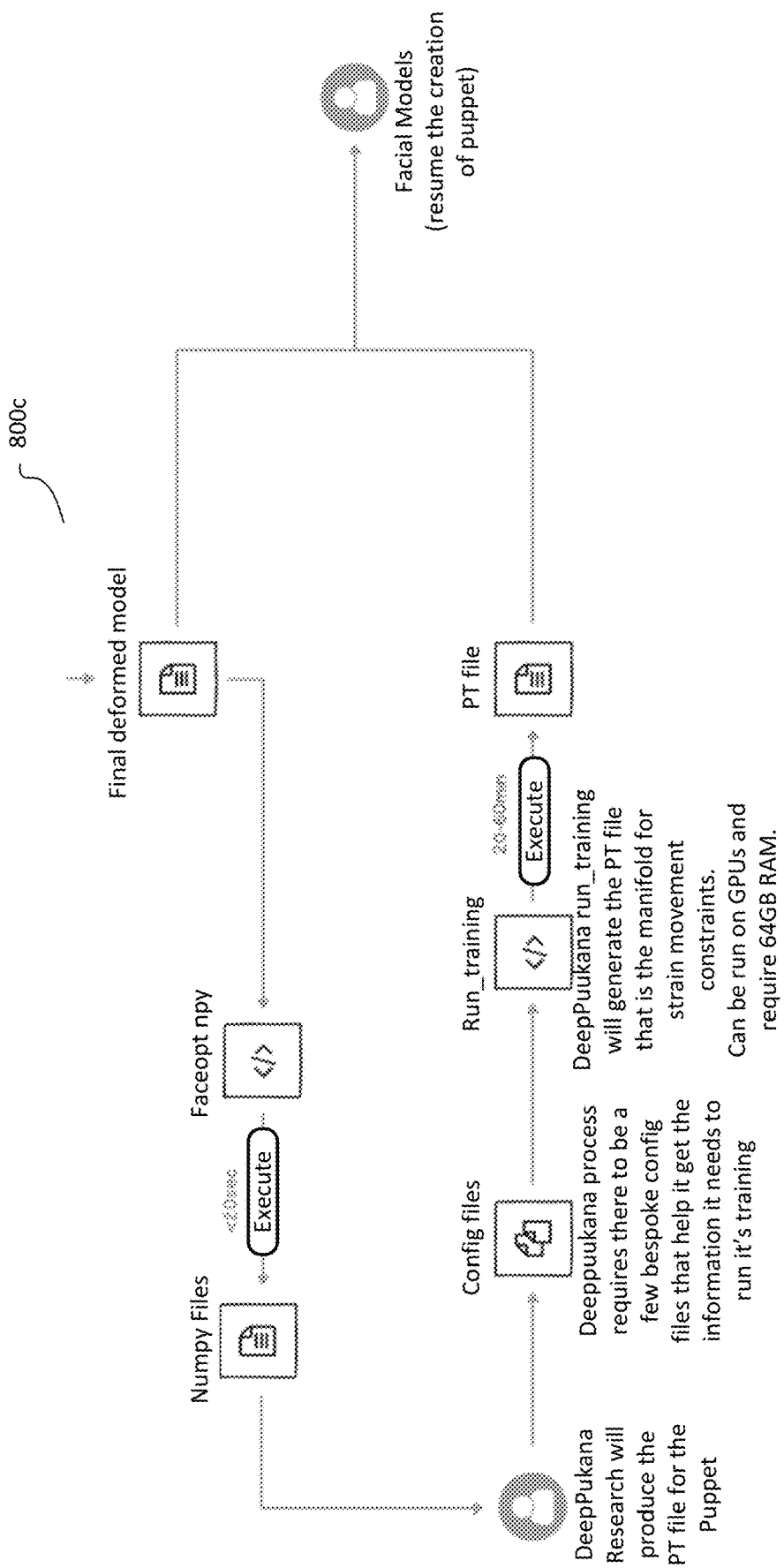

FIG. 8 illustrates a facial optimization module optimization and training. It shows how the jigsaw bundle master file resource is converted to a concatenated dynamic file. At the same time, the static Maya file is converted to a static definition, which is simply a static mesh saved as a binary file. After this, the facial optimization module optimization multi- stage steps run one after another, producing a series of optimized files, for jaw, eyes and skin. During this process, debug bakes can also be generated and exposed in a facial optimization module launcher user interface, so the user can check the progress. Files are then extracted from the dynamic and static files to become the input for training After training completes, the user can publish a cache product, which contains a learned manifold and a database resource.

The facial optimization module brush tool might be a Maya plugin to apply poses or interactively brush an actor's or characters face while guiding facial animators to stay inside a learned manifold. The brush tool might interact with a facial puppets node. The node might have under-the-hood access to a Python pytorch training file, the muscle strains, and the database file.

FIG. 9 illustrates a facial optimization module brush tool that a user can use to interactively pick poses and brush while being guided by the learned manifold. In this example, poses would be of a character 902 and the pose and facial expression can be manipulated by the user by modifying strain values on muscle curves. In this example, the character appears to be smiling based on the strain values applied. For some muscle curves, such as muscle curves 904, the strain is zero and those muscles are in their neutral pose position. For others, indicated with inward arrowheads, such as muscle curves 906, the strain is indicative of muscle contraction, while for others, indicated with outward arrowheads, such as muscle curves 908, the strain is indicative of muscle expansion. Thus, some of the strains have increased and others have decreased, indicating a muscle tension or change relative to the neutral pose.

Figure 10:
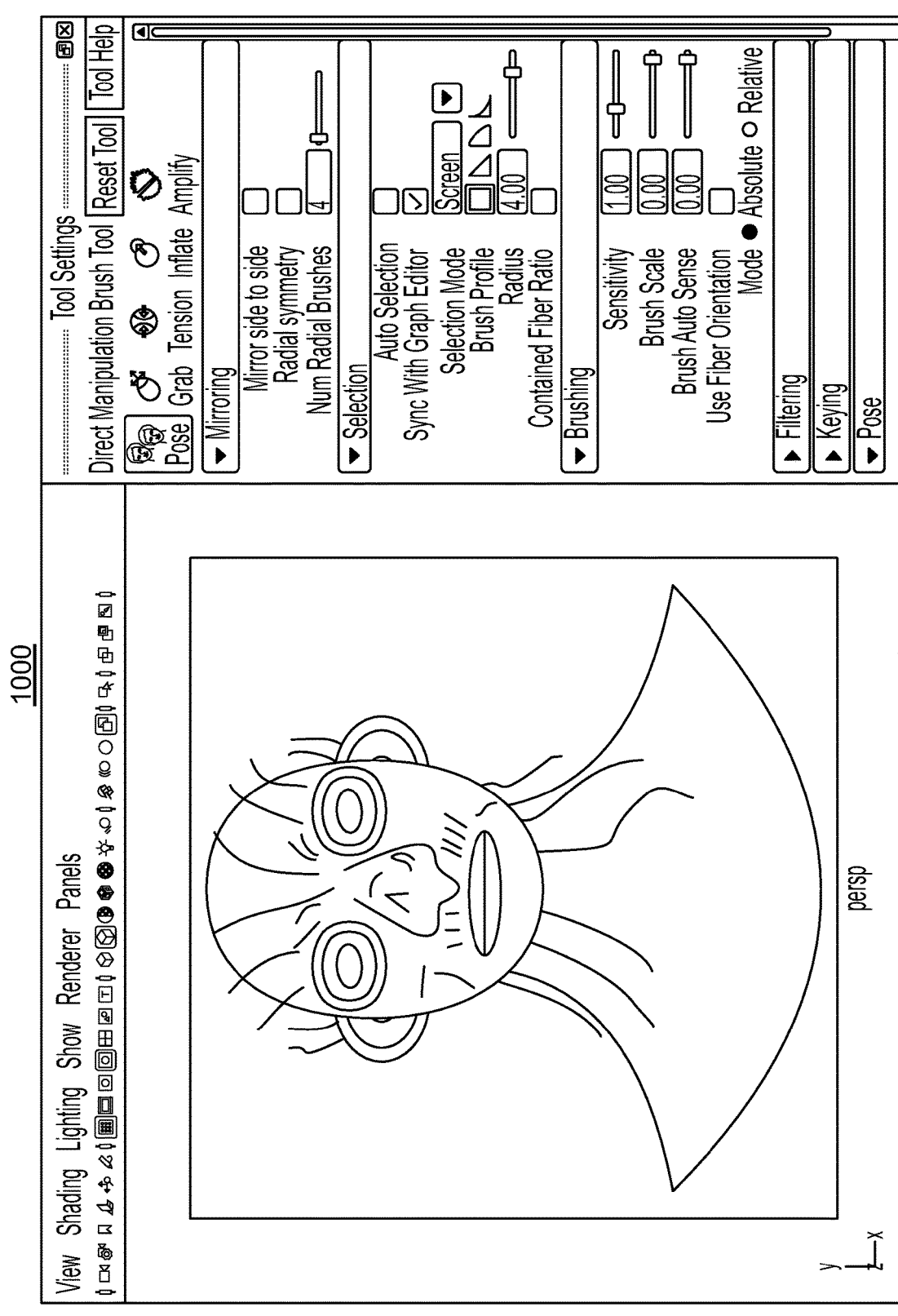
FIG. 10 illustrates a facial optimization module brush tool that visualizes the strains, according to an embodiment.
Figure 10:
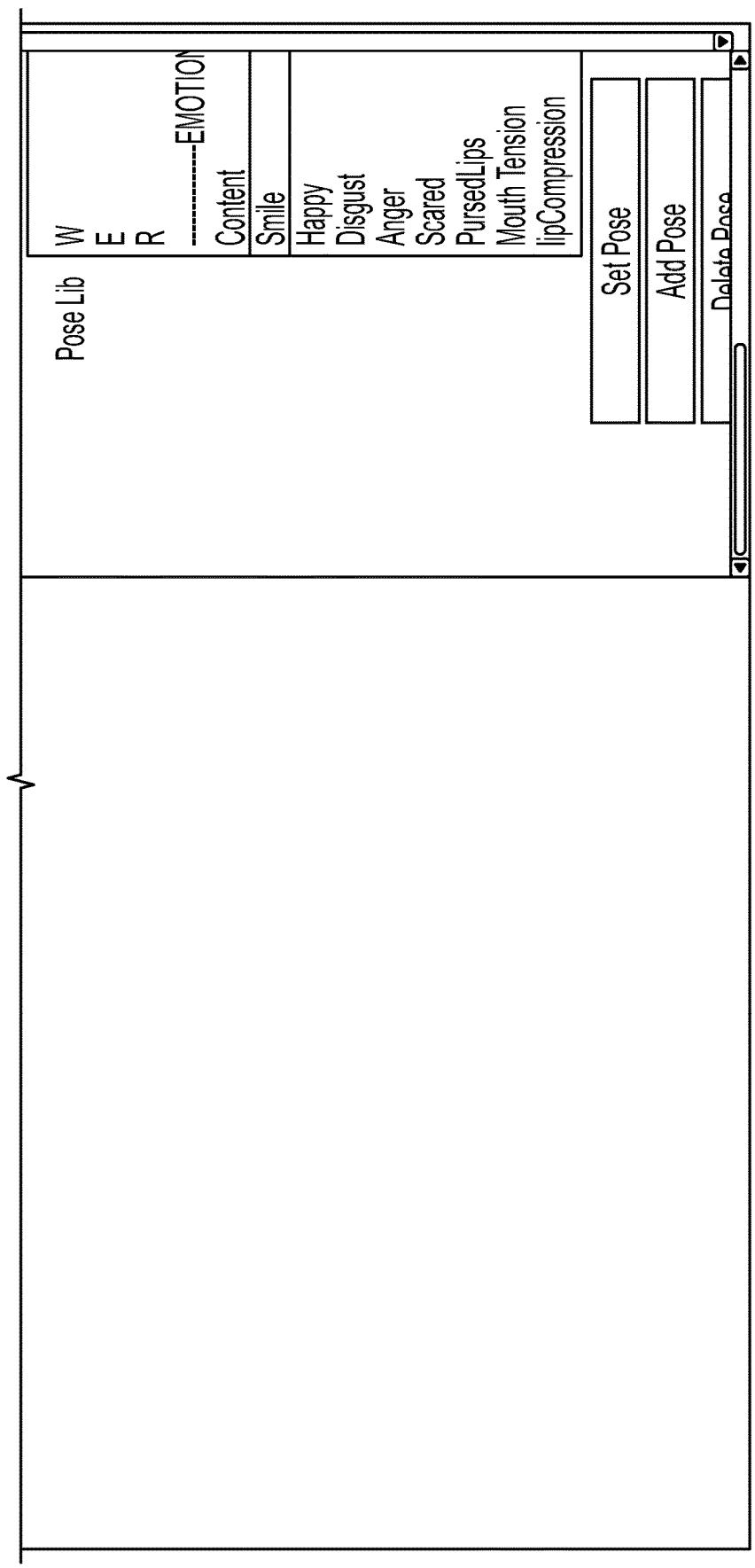

FIG. 10 illustrates a facial optimization module brush tool that visualizes the strains when they have not yet been posed, and are still in the neutral position.

A facial optimization module pipeline might include high-level tools, and wrap processes within other pipelines.

Figure 11A:
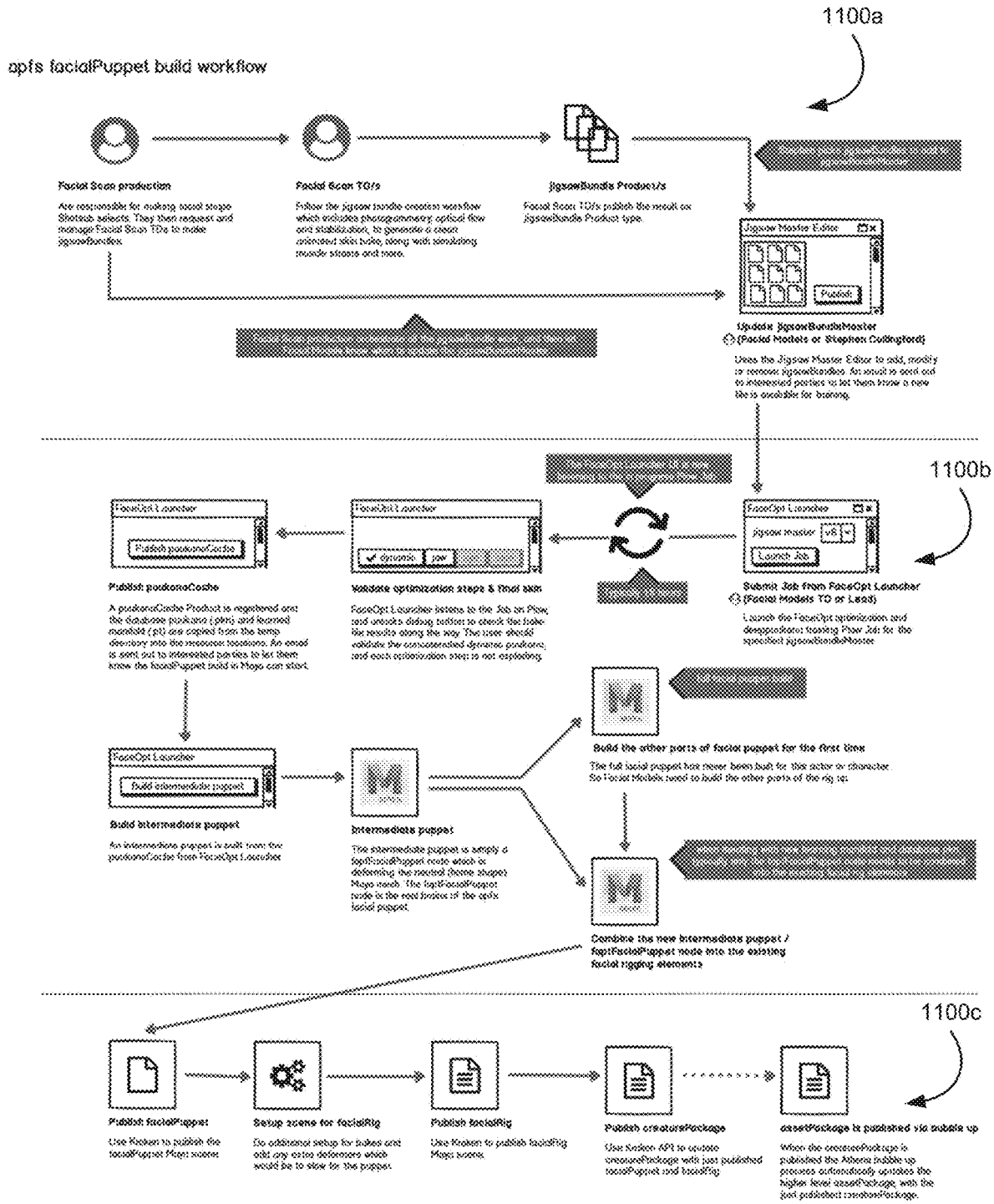
FIGS. 11A-11D illustrate an example of a facial puppet build and an iteration workflow, according to an embodiment.
Figure 11B:
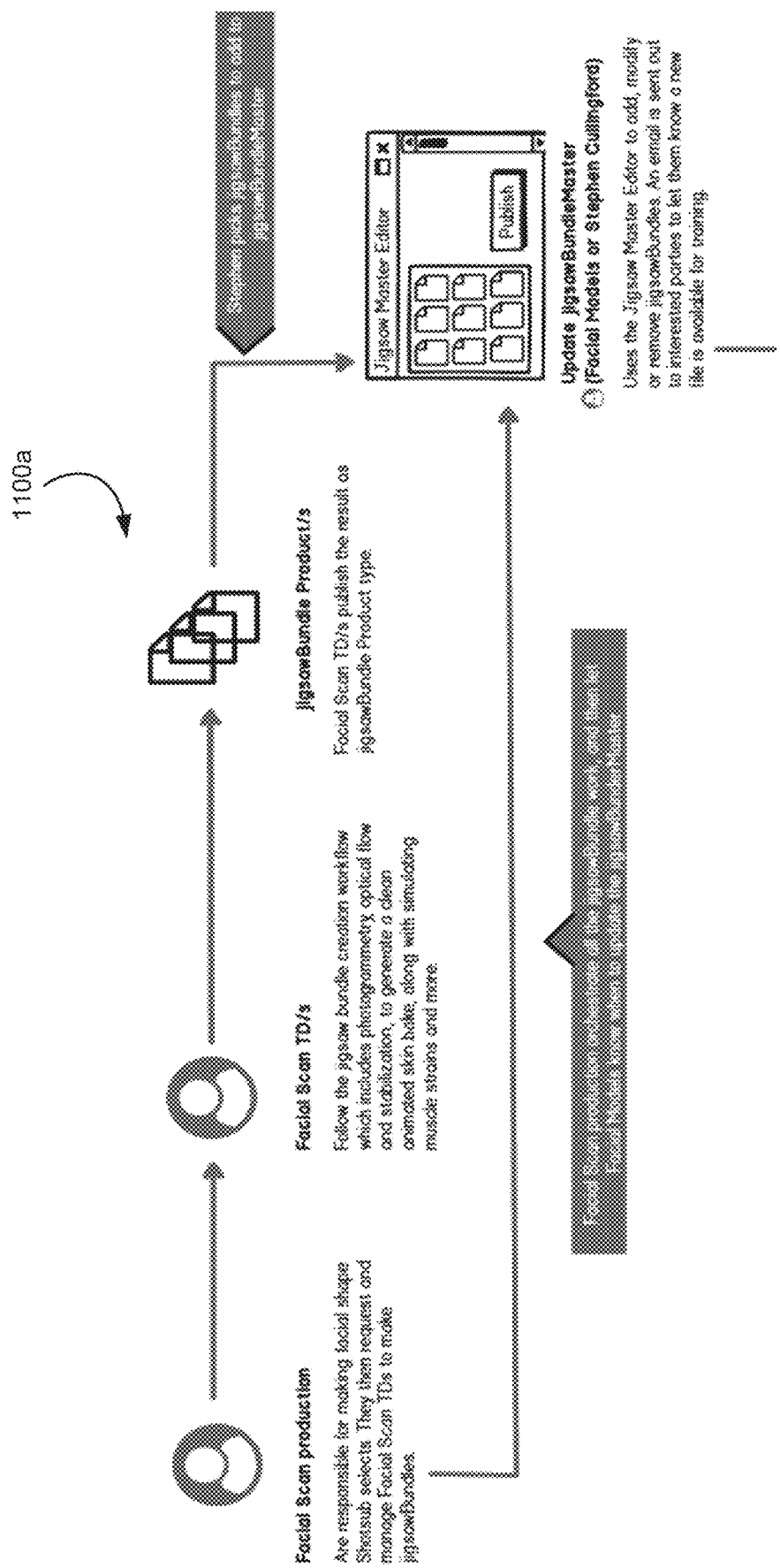
Figure 11C:
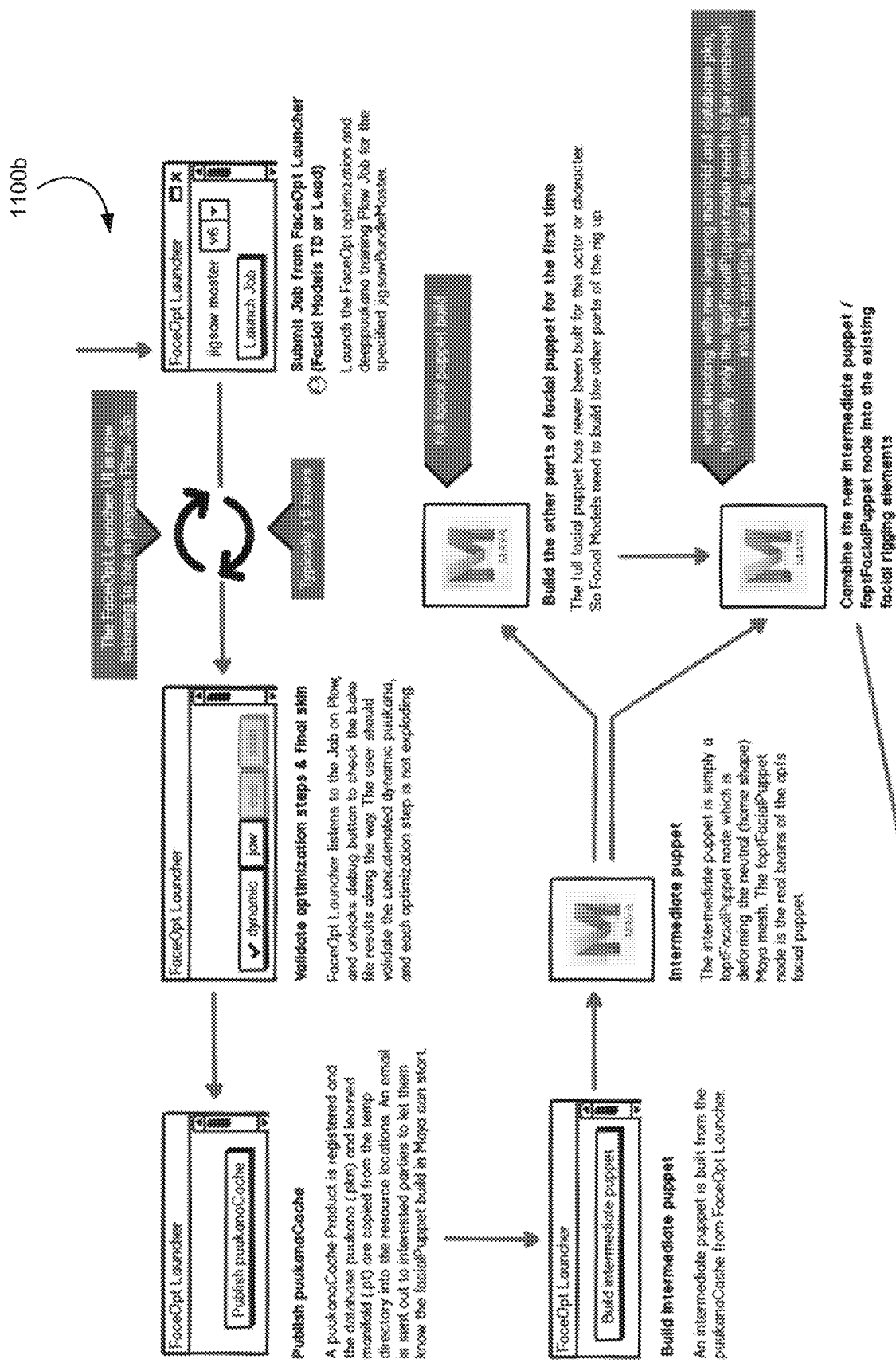
Figure 11D:
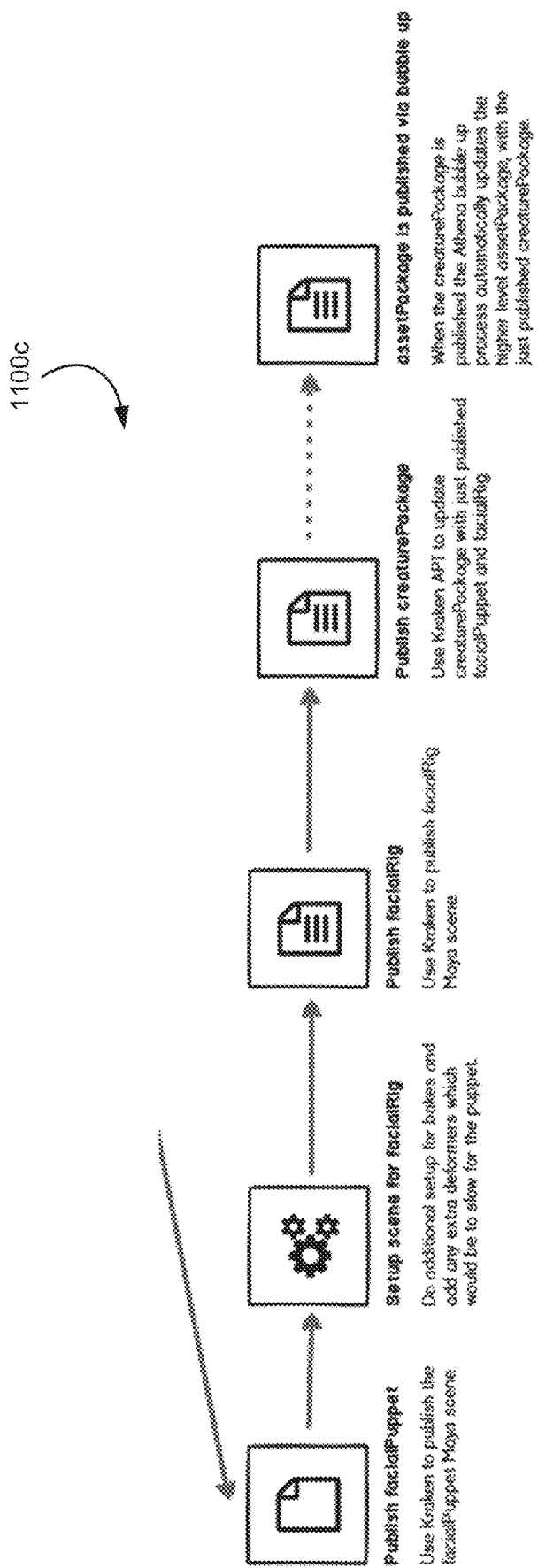

FIGS. 11A-11D illustrate an example of a facial puppet build and an iteration workflow from the stage of a jigsaw bundle creation to authoring a jigsaw bundle master file, and then running optimization and training, and building the intermediate puppet up into the full puppet. The flow chart shown in FIG. 6A are partitioned into three portions 1100a-c, the enlarged view of each of which is shown in FIGS. 11B-11D, respectively.

When authoring a jigsaw bundle master, the actor and character are related in that authoring an actor's jigsaw bundle master file can be created by a user who can also author related characters from a jigsaw master editor app. The editor currently can keep the shapes ordered across actors and characters, and encourage the user to validate frame counts to match.

When training, a facial optimization module launcher might launch a single actor or character at a time, with each UI window keeping track of one actor or character facial optimization and training job. Multiple actors or characters might be supported.

To reconstruct a facial scan, the actor's performance might be captured using photogrammetry software, such as the Zephyr software. Other steps might include optical flow, stabilization, jaw pass, simulating muscle strains and more. For the facial scan, a Maya scene with the necessary parts might be published as a jigsaw bundle product. The product might contain a clean animated skin mesh, and simulated strains that follow the underlying muscles.

Figure 12:
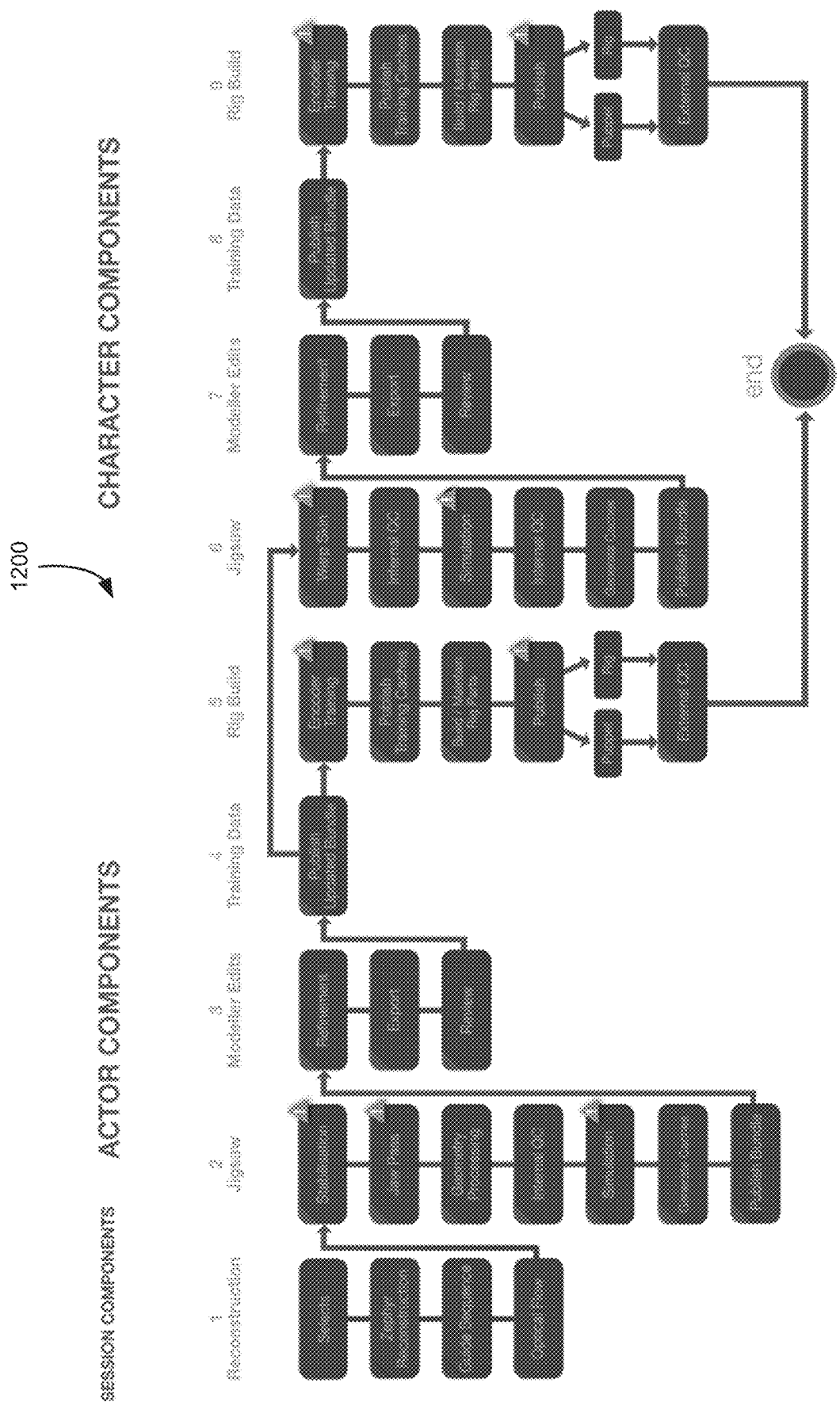
FIG. 12 illustrates how a facial scan file might use an actor's shot sub performance, according to an embodiment.

FIG. 12 illustrates how a facial scan file might take an actor's shot sub performance capture selection specified by a production and follow a reconstruction workflow to create a jigsaw bundle. The workflow might involve photogrammetry, optical flow and stabilization to generate a clean animated skin bake, along with other resources like simulated strands and jaw transform.

On the character side, there is a transfer process to warp the actors skin and simulate the strands for a character, thus creating a character specific jigsaw bundle.

Figure 13:
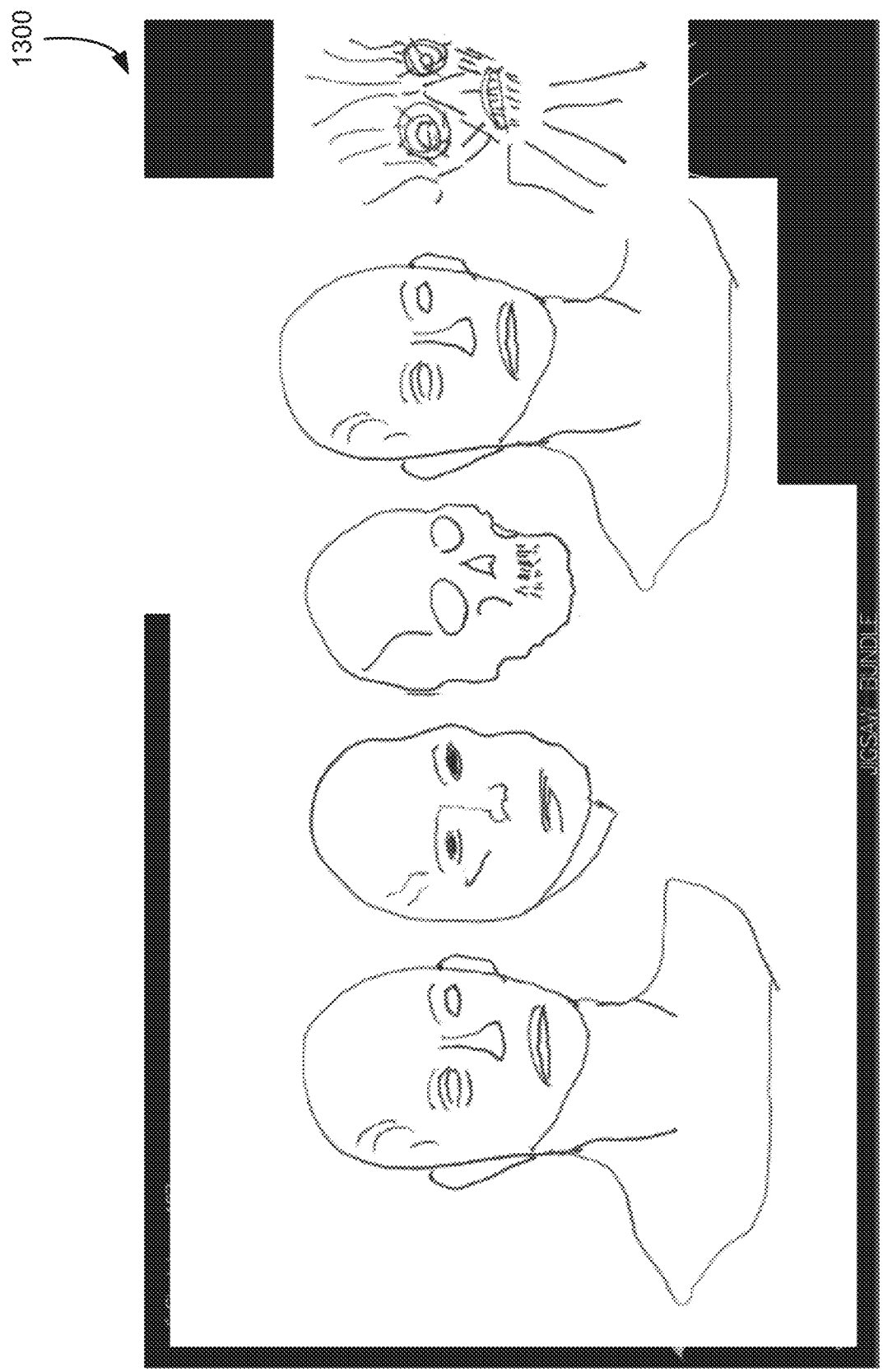
FIG. 13 illustrates resulting work before publishing a jigsaw bundle, according to an embodiment.

FIG. 13 illustrates resulting work before publishing a jigsaw bundle. A playblast shows a horizontal montage of the animated skin, skull, strains and more.

A tool might handle actor-to-character transfer based on radial basis functions of delta values from the neutral pose. With the additional guided shapes, the results of the transfer can be more in line with the artist's intention.

Figure 14:
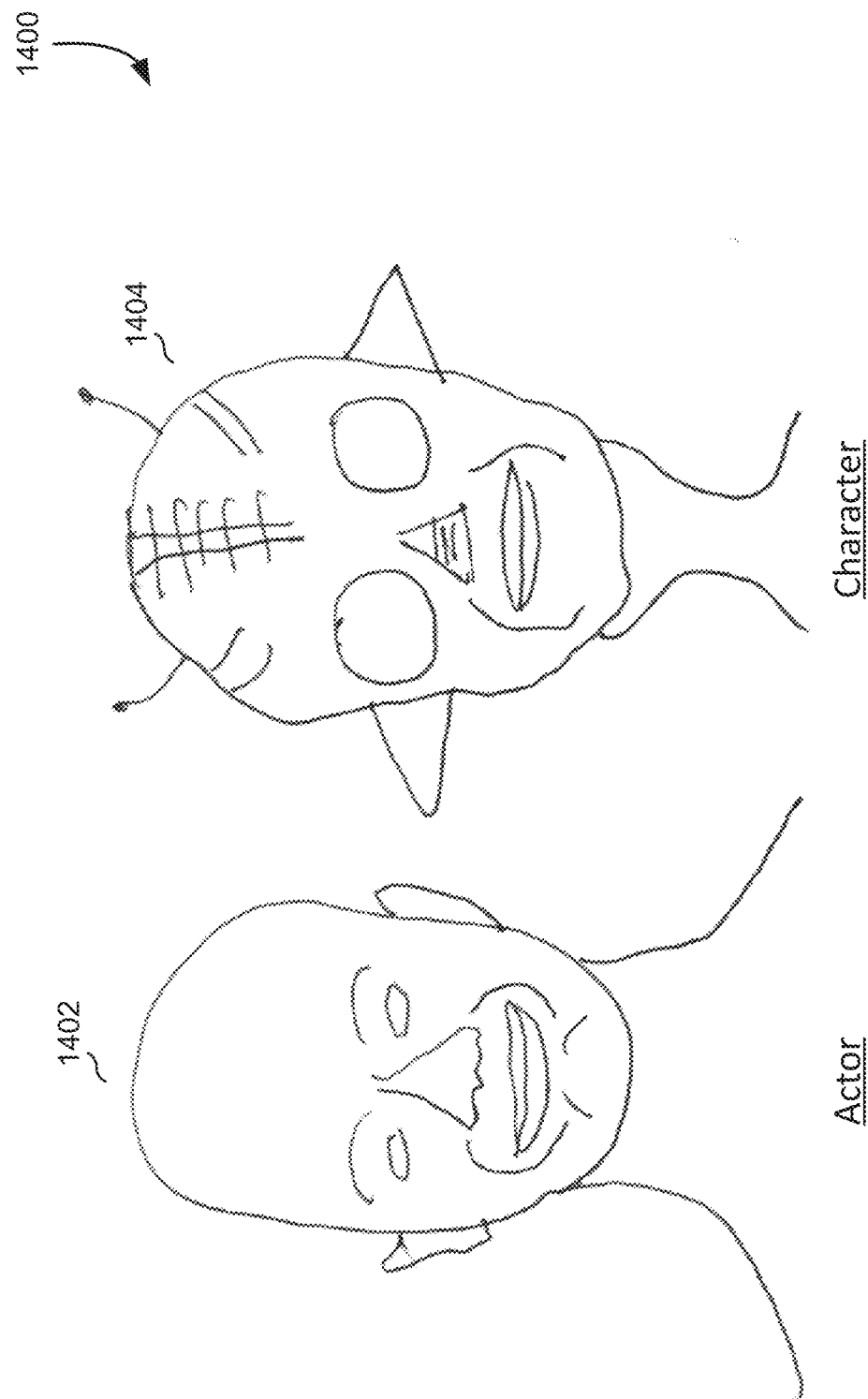
FIG. 14 illustrates an example of a result of actor-to-character facial shape transfer, according to an embodiment.

FIG. 14 illustrates an example of the result of actor-to-character facial shape transfer. In this example, a scan 1402 is obtained of a human actor. A facial rig might be generated from scans of the actor. A strain vector might be determined from a particular scan of the actor or combination of scans. That strain vector can then be applied to the facial rig of a character 1404, which might be a fanciful character having no counterparts in the real world, but where movements are effected according to muscle movements indicated by the strain vector and may result in a character performance that is commensurate with a performance of the actor and perhaps recognizable as being performed by that actor.

An intermediate puppet might be used. The intermediate puppet is a home shape (neutral) for an actor or character, whose mesh is being driven by a skin deformer node. The deformer node might only have an envelope exposed. The intermediate puppet might include a connected facial puppet plug-in node that has access to the learned manifold, simulated strains, and the vertex information from the database file.

Intermediate puppets can be built from a cache using a facial optimization API.

The per-shot PCA solve workflow might involve combining the actor's PCA source bundle (generated from a jigsaw bundle master). This might include elements extracted from the shots face camera media such as facial markers, depth estimate, and facial segmentation (e.g., lip contours).

The shots face camera elements are initially stabilized against the performer's head movement using the tracked facial markers and the PCA source bundle. This produces an animated actor mesh with coherent topology, which is then used as the target for the autoencoder solver (which simulates the strain curves). The results of this can either be transferred to the character, or become a shot-sculpt and published as a jigsaw bundle.

A facial motion artist might apply motion capture data to the puppet and publish it for the shot. At this point, the depth data and initial PCA would have already been solved.

An autoencoder is a neural network that learns to copy its input to its output, that has internal middle layer that describes the latent representation. It might comprise two main networks: an encoder that takes the input data into the code, and a decoder that maps that code to the original input.

A facial rig might be created as the facial puppet is prepped for bakes. It can contain extra deformers that are too slow to be added to the facial puppet. Where slow operations are acceptable, the facial rig can be used and where operations need to be fast, a facial puppet can be used.

Referring back to FIG. 6A, a facial puppet plug-in node outputs computed custom data, which can be plugged into a skin deformer port. The facial optimization module skin deformer can have a simple job of taking the output of the facial puppet plug-in node and deforming the home shape (neutral) mesh.

A skin deformer Maya plug-in node might be provided by a facial optimization module to take an output from a facial puppet node and deforms the home shape (neutral) mesh. It doesn't contain the core business logic like a facial puppet plugin node does.

A skin deformer node merely acts as another deformer in the deformation chain for the mesh.

The home shape (or neutral) is like any other facial shape (jigsaw bundle). Except it contains no animation and is considered the rest pose of the actor or character.

When building an intermediate puppet, the home shape/neutral might be the starting point. The pipeline might automatically derive the home shape for the specified data.

The intermediate puppet can be a home shape (neutral) for an actor or character, whose mesh is being directly driven by a skin deformer node.

A facial puppet node can be combined with facial rigging elements as a scene develops. Various node plugs can be connected up, to prepare the full puppet for publishing.

A jigsaw bundle might represent an animated facial shape (or neutral) and other resources. A jigsaw bundle data object might contain multiple bake resources, such as an animated skin bake and simulated strains that follow the underlying muscles of the face, which might be derived from an anatomical. Data object might also contain other resources like a skull shape, joint transforms, and a scan mask.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 15:
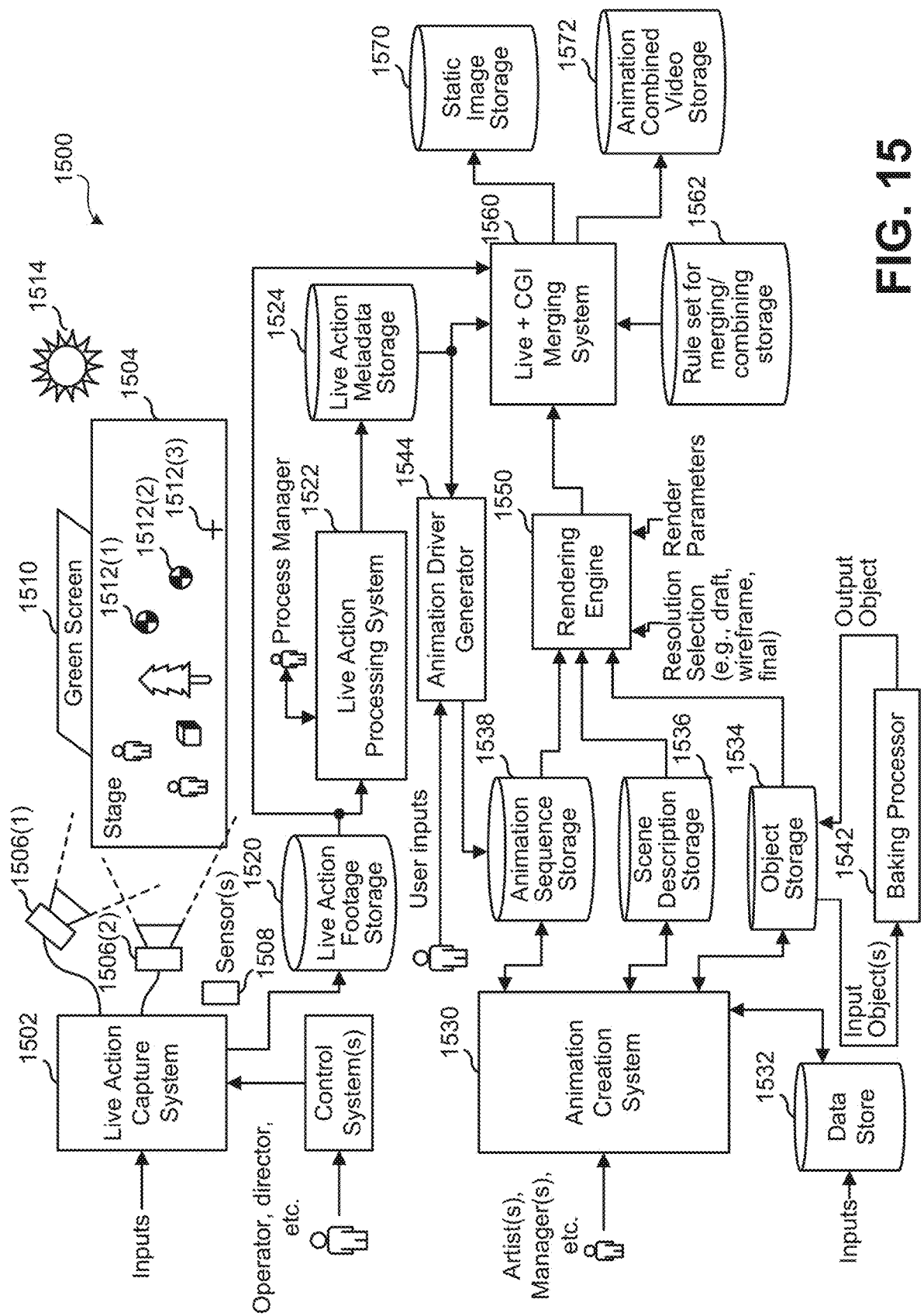
FIG. 15 illustrates an example visual content generation system as might be used to generate imagery in the form of still images and/or video sequences of images.

For example, FIG. 15 illustrates the example visual content generation system 1500 as might be used to generate imagery in the form of still images and/or video sequences of images. Visual content generation system 1500 might generate imagery of live action scenes, computer generated scenes, or a combination thereof. In a practical system, users are provided with tools that allow them to specify, at high levels and low levels where necessary, what is to go into that imagery. For example, a user might be an animation artist (like artist 122 illustrated in FIG. 1) and might use visual content generation system 1500 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1400 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two- dimensional views. In yet other embodiments, pixel values are data structures and a pixel value is associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., artist 122 illustrated in FIG. 1) might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 15, a live action capture system 1502 captures a live scene that plays out on a stage 1504. Live action capture system 1502 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1506(1) and 1506(2) capture the scene, while in some systems, there might be other sensor(s) 1508 that capture information from the live scene (e.g., infrared cameras, infrared sensors, motion capture ("mo-cap") detectors, etc.). On stage 1504, there might be human actors, animal actors, inanimate objects, background objects, and possibly an object such as a green screen 1510 that is designed to be captured in a live scene recording in such a way that it is easily overlaid with computer-generated imagery. Stage 1504 might also contain objects that serve as fiducials, such as fiducials 1512(1)-(3), that might be used post-capture to determine where an object was during capture. A live action scene might be illuminated by one or more lights, such as an overhead light 1514.

During or following the capture of a live action scene, live action capture system 1502 might output live action footage to a live action footage storage 1520. A live action processing system 1522 might process live action footage to generate data about that live action footage and store that data into a live action metadata storage 1524. Live action processing system 1522 might include computer processing capabilities, image processing capabilities, one or more processors, program code storage for storing program instructions executable by the one or more processors, as well as user input devices and user output devices, not all of which are shown. Live action processing system 1522 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 1514, as that might be useful in post-processing to match computer-generated lighting on objects that are computer-generated and overlaid on the live action footage. Live action processing system 1522 might operate autonomously, perhaps based on predetermined program instructions, to generate and output the live action metadata upon receiving and inputting the live action footage. The live action footage can be camera-captured data as well as data from other sensors.

An animation creation system 1530 is another part of visual content generation system 1500. Animation creation system 1530 might include computer processing capabilities, image processing capabilities, one or more processors, program code storage for storing program instructions executable by the one or more processors, as well as user input devices and user output devices, not all of which are shown. Animation creation system 1530 might be used by animation artists, managers, and others to specify details, perhaps programmatically and/or interactively, of imagery to be generated. From user input and data from a database or other data source, indicated as a data store 1532, animation creation system 1530 might generate and output data representing objects (e.g., a horse, a human, a ball, a teapot, a cloud, a light source, a texture, etc.) to an object storage 1534, generate and output data representing a scene into a scene description storage 1536, and/or generate and output data representing animation sequences to an animation sequence storage 1538.

Scene data might indicate locations of objects and other visual elements, values of their parameters, lighting, camera location, camera view plane, and other details that a rendering engine 1550 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1530 might be interactive, allowing a user to read in animation sequences, scene descriptions, object details, etc. and edit those, possibly returning them to storage to update or replace existing data. As an example, an operator might read in objects from object storage into a baking processor 1542 that would transform those objects into simpler forms and return those to object storage 1534 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 1532 might be used to drive object presentation. For example, if an artist is creating an animation of a spaceship passing over the surface of the Earth, instead of manually drawing or specifying a coastline, the artist might specify that animation creation system 1530 is to read data from data store 1532 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1544 might read in live action metadata, such as data representing movements and positions of body parts of a live actor during a live action scene. Animation driver generator 1544 might generate corresponding animation parameters to be stored in animation sequence storage 1538 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1522. Animation driver generator 1544 might convert that movement data into specifications of how joints of an articulated CGI character are to move over time.

A rendering engine 1550 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 1550 might include computer processing capabilities, image processing capabilities, one or more processors, program code storage for storing program instructions executable by the one or more processors, as well as user input devices and user output devices, not all of which are shown.

Visual content generation system 1500 can also include a merging system 1560 that merges live footage with animated content. The live footage might be obtained and input by reading from live action footage storage 1520 to obtain live action footage, by reading from live action metadata storage 1524 to obtain details such as presumed segmentation in captured images segmenting objects in a live action scene from their background (perhaps aided by the fact that green screen 1510 was part of the live action scene), and by obtaining CGI imagery from rendering engine 1550.

A merging system 1560 might also read data from rulesets for merging/combining storage 1562. A very simple example of a rule in a ruleset might be "obtain a full image including a two-dimensional pixel array from live footage, obtain a full image including a two-dimensional pixel array from rendering engine 1550, and output an image where each pixel is a corresponding pixel from rendering engine 1550 when the corresponding pixel in the live footage is a specific color of green, otherwise output a pixel value from the corresponding pixel in the live footage."

Merging system 1560 might include computer processing capabilities, image processing capabilities, one or more processors, program code storage for storing program instructions executable by the one or more processors, as well as user input devices and user output devices, not all of which are shown. Merging system 1560 might operate autonomously, following programming instructions, or might have a user interface or programmatic interface over which an operator can control a merging process. In some embodiments, an operator can specify parameter values to use in a merging process and/or might specify specific tweaks to be made to an output of merging system 1560, such as modifying boundaries of segmented objects, inserting blurs to smooth out imperfections, or adding other effects. Based on its inputs, merging system 1560 can output an image to be stored in a static image storage 1570 and/or a sequence of images in the form of video to be stored in an animated/combined video storage 1572.

Thus, as described, visual content generation system 1500 can be used to generate video that combines live action with computer-generated animation using various components and tools, some of which are described in more detail herein. While visual content generation system 1500 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special- purpose computing devices may be used, such as desktop computer systems, portable computer systems, handheld devices, networking devices or any other device that incorporates hard-wired and/or program logic to implement the techniques.

Figure 16:
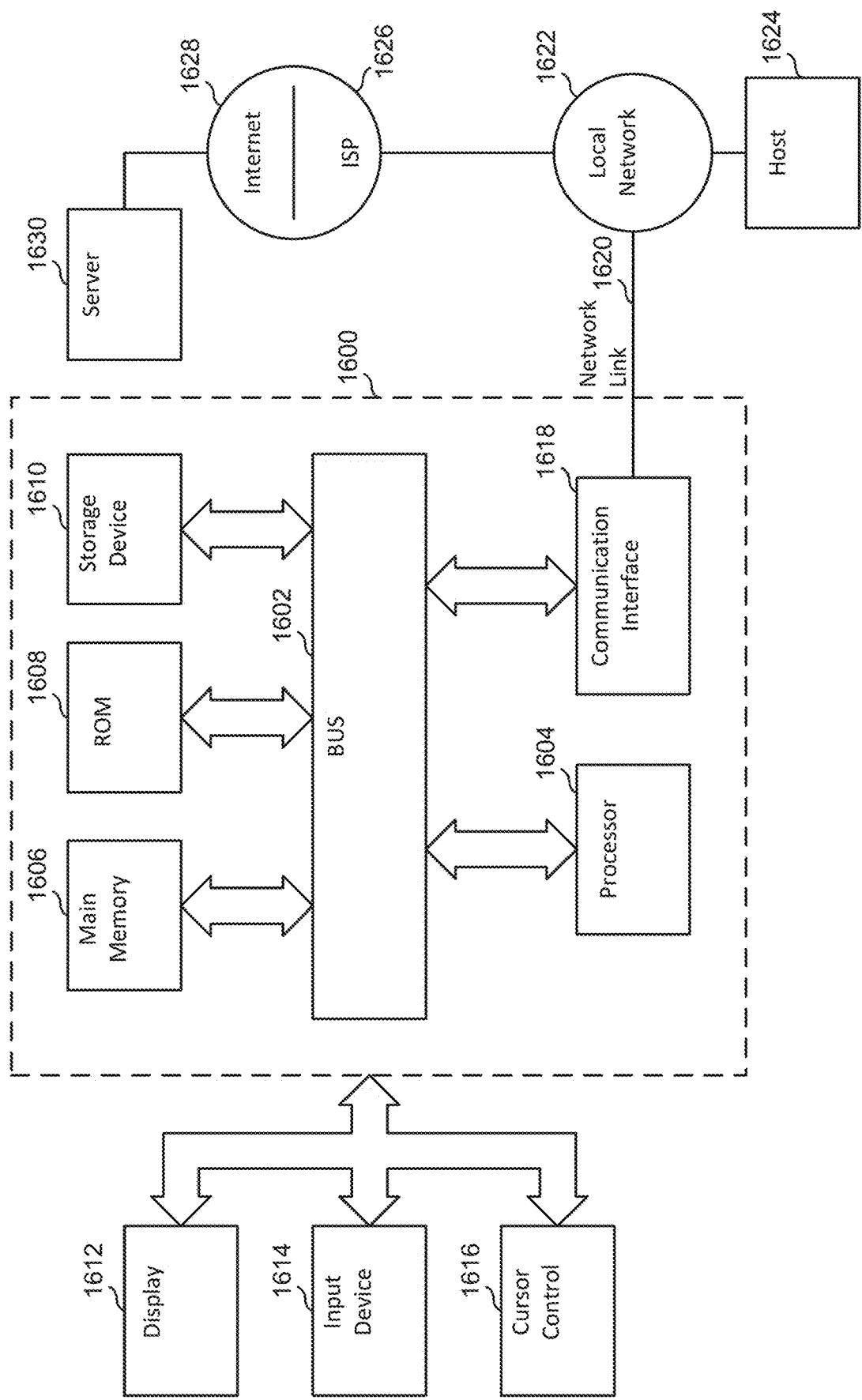
FIG. 16 is a block diagram illustrating an example computer system upon which the systems illustrated herein may be implemented.

For example, FIG. 16 is a block diagram that illustrates a computer system 1600 upon which the computer systems of the systems described herein and/or visual content generation system 1500 (see FIG. 15) may be implemented. Computer system 1600 includes a bus 1602 or other communication mechanism for communicating information, and a processor 1604 coupled with bus 1602 for processing information. Processor 1604 may be, for example, a general-purpose microprocessor.

Computer system 1600 also includes a main memory 1606, such as a random-access memory (RAM) or other dynamic storage device, coupled to bus 1602 for storing information and instructions to be executed by processor 1604. Main memory 1606 may also be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a computer monitor, for displaying information to a computer user. An input device 1614, including alphanumeric and other keys, is coupled to bus 1602 for communicating information and command selections to processor 1604. Another type of user input device is a cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid-state drive of a remote computer. The remote computer can load the instructions into its dynamic memory and send the instructions over a network connection. A modem or network interface local to computer system 1600 can receive the data. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be a network card, a modem, a cable modem, or a satellite modem to provide a data communication connection to a corresponding type of telephone line or communications line. Wireless links may also be implemented. In any such implementation, communication interface 1618 sends and receives electrical, electromagnetic, or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world-wide packet data communication network now commonly referred to as the "Internet" 1628. Local network 1622 and Internet 1628 both use electrical, electromagnetic, or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620, and communication interface 1618. In the Internet example, a server 1630 might transmit a requested code for an application program through the Internet 1628, ISP 1626, local network 1622, and communication interface 1618. The received code may be executed by processor 1604 as it is received, and/or stored in storage device 1610, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above- disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for generating a facial puppet usable in an animation system, the method comprising:
    receiving data associated with a first plurality of facial scans of a face of a first live actor over a first plurality of facial expression poses;
    training a first artificial intelligence system to match the first plurality of facial scans to a first muscle model that could, at least approximately, express some of the first plurality of facial expression poses;
    extracting from the first plurality of facial expression poses, physical deformations of a first facial surface of the face of the first live actor;
    receiving data associated with a second plurality of facial scans of a face of a second live actor over a second plurality of facial expression poses;
    training the first artificial intelligence system to match the second plurality of facial scans to a second muscle model that could, at least approximately, express some of the second plurality of facial expression poses;
    extracting from the second plurality of facial expression poses, physical deformations of a second facial surface of the face of the second live actor;
    using a neural network to derive the facial puppet from the first muscle model and the second muscle model;

generating, using an animation creation system, a mesh representing the facial puppet that is formed into expressions based on the facial puppet, strain vector values, and their corresponding deformations; and determining values for a set of vector values in a strain vector that adjust the mesh to form an animated facial expression that corresponds to a plausible facial expression from a live actor selected from the first live actor and the second live actor.

2. The method of claim 1, further comprising:
determining a first set of delta data corresponding to the facial puppet and the first muscle model; and
determining a second set of delta data corresponding to the facial puppet and the second muscle model.

3. The method of claim 2, further comprising using the first set of delta data or the second set of delta data to adjust an animation output that used the facial puppet.

4. The method of claim 1, wherein determining the values for the set of vector values further comprise strain values associated with expansion and contraction of a set of simulated facial muscles.

5. The method of claim 1, further comprising constraining the strain vector values by a facial constraint manifold of a selected live actor.

6. The method of claim 5, wherein constraining comprises projecting a nonplausible strain vector onto the facial constraint manifold to arrive at a plausible strain vector.

7. The method of claim 1, further comprising rendering an animated image using the adjusted mesh forming the animated facial expression that corresponds to a plausible facial expression from a live actor selected from the first live actor and the second live actor.

8. A computer system comprising:
one or more processors at least one processor; and
a storage medium storing instructions, which when executed by the at least one processor, cause the computer system to:
receive data associated with a first plurality of facial scans of a face of a first live actor over a first plurality of facial expression poses;
train a first artificial intelligence system to match the first plurality of facial scans to a first muscle model that could, at least approximately, express some of the first plurality of facial expression poses;
extract from the first plurality of facial expression poses, physical deformations of a first facial surface of the face of the first live actor;
receive data associated with a second plurality of facial scans of a face of a second live actor over a second plurality of facial expression poses;
train the first artificial intelligence system to match the second plurality of facial scans to a second muscle model that could, at least approximately, express some of the second plurality of facial expression poses;
extract from the second plurality of facial expression poses, physical deformations of a second facial surface of the face of the second live actor;
derive, using a neural network, a facial puppet from the first muscle model and the second muscle model;
generate, using an animation creation system, a mesh representing the facial puppet that is formed into expressions based on the facial puppet, strain vector values, and their corresponding deformations; and
determine values for a set of vector values in a strain vector that adjust the mesh to form an animated facial expression that corresponds to a plausible facial expression from a live actor selected from the first live actor and the second live actor.

9. The computer system of claim 8, wherein a first set of delta data corresponds to the facial puppet and the first muscle model and a second set of delta data corresponds to the facial puppet and the second muscle model.

10. The computer system of claim 9, wherein the first set of delta data or the second set of delta data comprise data used to adjust an animation output that used the facial puppet.

11. The computer system of claim 8, wherein the values for the set of vector values further comprise strain values associated with expansion and contraction of a set of simulated facial muscles.

12. The computer system of claim 8, further comprising constraining the strain vector values by a facial constraint manifold of a selected live actor.

13. The computer system of claim 12, wherein constraining comprises projecting a nonplausible strain vector onto the facial constraint manifold to arrive at a plausible strain vector.

14. The computer system of claim 8, further comprising rendering an animated image using the adjusted mesh forming the animated facial expression that corresponds to a plausible facial expression from a live actor selected from the first live actor and the second live actor.

15. A non-transitory computer-readable storage medium storing instructions, which when executed by at least one processor of a computer system, causes the computer system to:
receive data associated with a first plurality of facial scans of a face of a first live actor over a first plurality of facial expression poses;
train a first artificial intelligence system to match the first plurality of facial scans to a first muscle model that could, at least approximately, express some of the first plurality of facial expression poses;
extract from the first plurality of facial expression poses, physical deformations of a first facial surface of the face of the first live actor;
receive data associated with a second plurality of facial scans of a face of a second live actor over a second plurality of facial expression poses;
train the first artificial intelligence system to match the second plurality of facial scans to a second muscle model that could, at least approximately, express some of the second plurality of facial expression poses;
extract from the second plurality of facial expression poses, physical deformations of a second facial surface of the face of the second live actor;
derive, using a neural network, a facial puppet from the first muscle model and the second muscle model;
generate, using an animation creation system, a mesh representing the facial puppet that is formed into expressions based on the facial puppet, strain vector values, and their corresponding deformations; and
determine values for a set of vector values in a strain vector that adjust the mesh to form an animated facial expression that corresponds to a plausible facial expression from a live actor selected from the first live actor and the second live actor.

16. The non-transitory computer-readable storage medium of claim 15, further storing instructions, which when executed by the at least one processor of the computer system, causes the computer system to:

determine a first set of delta data corresponding to the facial puppet and the first muscle model; and determine a second set of delta data corresponding to the facial puppet and the second muscle model.

17. The non-transitory computer-readable storage medium of claim 15, further storing instructions, which when executed by the at least one processor of the computer system, causes the computer system to determine the values for the set of vector values further comprise strain values associated with expansion and contraction of a set of simulated facial muscles.

18. The non-transitory computer-readable storage medium of claim 15, further storing instructions, which when executed by the at least one processor of the computer system, causes the computer system to project a nonplausible strain vector onto a facial constraint manifold to arrive at a plausible strain vector.

19. The non-transitory computer-readable storage medium of claim 15, further storing instructions, which when executed by the at least one processor of the computer system, causes the computer system to render an animated image using the adjusted mesh forming the animated facial expression that corresponds to a plausible facial expression from a live actor selected from the first live actor and the second live actor.

* * * * *